United States Patent
de Kleer et al.

(10) Patent No.: US 8,165,705 B2
(45) Date of Patent: Apr. 24, 2012

(54) METHODS AND SYSTEMS FOR CONTINUOUSLY ESTIMATING PERSISTENT AND INTERMITTENT FAILURE PROBABILITIES FOR PRODUCTION RESOURCES

(75) Inventors: Johan de Kleer, Los Altos, CA (US); Lukas Daniel Kuhn, Palo Alto, CA (US); Robert Price, Palo Alto, CA (US); Minh Binh Do, Mountain View, CA (US); Rong Zhou, Cupertino, CA (US); Juan Liu, Milpitas, CA (US); Eric Saund, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 419 days.

(21) Appl. No.: 12/489,724

(22) Filed: Jun. 23, 2009

(65) Prior Publication Data

US 2010/0011255 A1    Jan. 14, 2010

Related U.S. Application Data

(60) Provisional application No. 61/079,456, filed on Jul. 10, 2008, provisional application No. 61/098,392, filed on Sep. 19, 2008.

(51) Int. Cl.
*G06F 19/00* (2011.01)
(52) U.S. Cl. ........ 700/108; 702/181; 702/183; 714/47.1
(58) Field of Classification Search .................... 700/99, 700/100, 108, 109, 110, 111, 174; 702/181, 702/183, 185; 714/47, 47.1, E11.024
See application file for complete search history.

(56) References Cited

U.S. PATENT DOCUMENTS

| | | | |
|---|---|---|---|
| 4,563,746 A | 1/1986 | Yoshida et al. | |
| 5,006,992 A | 4/1991 | Skeirik | |
| 5,009,833 A | 4/1991 | Takeuchi et al. | |
| 5,023,045 A | 6/1991 | Watanabe et al. | |
| 5,070,468 A | 12/1991 | Niinomi et al. | |
| 5,214,577 A * | 5/1993 | Sztipanovits et al. | ........... 700/79 |
| 5,268,834 A | 12/1993 | Sanner et al. | |
| 5,305,426 A | 4/1994 | Ushioda et al. | |
| 5,315,502 A | 5/1994 | Koyama et al. | |
| 5,486,995 A | 1/1996 | Krist et al. | |
| 5,521,814 A | 5/1996 | Teran et al. | |
| 5,581,459 A | 12/1996 | Enbutsu et al. | |

(Continued)

OTHER PUBLICATIONS

European Search Report, EP 10 15 6820, Jul. 8, 2010.

(Continued)

*Primary Examiner* — Charles Kasenge
(74) *Attorney, Agent, or Firm* — Fay Sharpe LLP

(57) ABSTRACT

Production control systems and methods are presented for estimation of production resource failure probabilities in which a set of four count values are maintained and updated for each resource including a first count value $m_{11}$ indicating a number of plans where the resource m was used and failed, a second count value $m_{10}$ indicating a number of plans where the resource m was used and succeeded, a third count value $m_{01}$ indicating a number of plans where the resource m was not used and failed, and a fourth count value $m_{00}$ indicating a number of plans where the resource m was not used and succeeded, and the current fault probability for each resource is estimated and stored for single or multiple, persistent or intermittent faults based on the corresponding count values.

22 Claims, 12 Drawing Sheets

U.S. PATENT DOCUMENTS

| | | | |
|---|---|---|---|
| 5,587,930 | A | 12/1996 | Hori et al. |
| 5,701,394 | A | 12/1997 | Arita et al. |
| 5,748,496 | A | 5/1998 | Takahashi et al. |
| 5,914,875 | A | 6/1999 | Monta et al. |
| 6,012,152 | A | 1/2000 | Douik et al. |
| 6,038,540 | A | 3/2000 | Krist et al. |
| 6,113,256 | A | 9/2000 | Bonissone et al. |
| 6,263,277 | B1 | 7/2001 | Tanimoto et al. |
| 6,272,483 | B1 | 8/2001 | Joslin et al. |
| 6,326,758 | B1 | 12/2001 | Discenzo |
| 6,411,908 | B1* | 6/2002 | Talbott .............. 702/34 |
| 6,415,276 | B1 | 7/2002 | Heger et al. |
| 6,651,048 | B1 | 11/2003 | Agrawal et al. |
| 6,725,208 | B1 | 4/2004 | Hartman et al. |
| 6,735,549 | B2* | 5/2004 | Ridolfo .............. 702/181 |
| 6,764,267 | B2 | 7/2004 | Hart et al. |
| 6,795,798 | B2 | 9/2004 | Eryurek et al. |
| 6,795,799 | B2 | 9/2004 | Deb et al. |
| 6,847,854 | B2 | 1/2005 | Discenzo |
| 6,853,930 | B2* | 2/2005 | Hayashi et al. .......... 702/61 |
| 6,895,292 | B2 | 5/2005 | Fromherz et al. |
| 6,898,475 | B1 | 5/2005 | Ruml et al. |
| 6,907,381 | B2* | 6/2005 | Hayashi et al. .......... 702/181 |
| 6,925,338 | B2 | 8/2005 | Eryurek et al. |
| 6,947,797 | B2 | 9/2005 | Dean et al. |
| 6,965,806 | B2 | 11/2005 | Eryurek et al. |
| 6,965,887 | B2 | 11/2005 | Huelsman et al. |
| 7,043,321 | B2 | 5/2006 | Ruml et al. |
| 7,062,478 | B1 | 6/2006 | Huelsman |
| 7,162,393 | B1* | 1/2007 | Vacar et al. .......... 702/183 |
| 7,164,954 | B2 | 1/2007 | Lefebvre et al. |
| 7,206,771 | B2* | 4/2007 | Alvarez et al. .......... 706/45 |
| 7,216,018 | B2 | 5/2007 | Zuo et al. |
| 7,230,736 | B2 | 6/2007 | Fromherz et al. |
| 7,233,405 | B2 | 6/2007 | Fromherz |
| 7,346,404 | B2 | 3/2008 | Eryurek et al. |
| 7,356,383 | B2 | 4/2008 | Pechtl et al. |
| 7,433,743 | B2 | 10/2008 | Pistikopoulos et al. |
| 7,451,003 | B2 | 11/2008 | Chester et al. |
| 7,467,841 | B2* | 12/2008 | Kamisuwa et al. .......... 347/19 |
| 7,469,185 | B2 | 12/2008 | Mendrick et al. |
| 7,574,334 | B2 | 8/2009 | Tiwari et al. |
| 7,689,309 | B2 | 3/2010 | Zheng |
| 7,711,674 | B2 | 5/2010 | Arthur et al. |
| 7,725,857 | B2 | 5/2010 | Foltz et al. |
| 7,903,844 | B2* | 3/2011 | Satonaga et al. .......... 382/112 |
| 7,937,175 | B2 | 5/2011 | de Kleer et al. |
| 2002/0184176 | A1 | 12/2002 | Fromherz et al. |
| 2004/0002776 | A1 | 1/2004 | Bickford |
| 2004/0008820 | A1 | 1/2004 | Schmitt |
| 2006/0064291 | A1 | 3/2006 | Pattipatti et al. |
| 2006/0230313 | A1 | 10/2006 | Grichnick et al. |
| 2007/0043607 | A1 | 2/2007 | Howard et al. |
| 2007/0129834 | A1 | 6/2007 | Howard et al. |
| 2008/0010230 | A1 | 1/2008 | Smith et al. |
| 2008/0010522 | A1 | 1/2008 | Uwatoko et al. |
| 2008/0039969 | A1 | 2/2008 | Liu et al. |
| 2008/0062211 | A1* | 3/2008 | Kamisuwa et al. .......... 347/5 |
| 2008/0071716 | A1 | 3/2008 | Anderson et al. |
| 2008/0148257 | A1 | 6/2008 | Ruml et al. |
| 2008/0215509 | A1 | 9/2008 | Charlton |
| 2009/0043809 | A1 | 2/2009 | Fakhouri et al. |
| 2009/0183777 | A1 | 7/2009 | Herman et al. |
| 2009/0204234 | A1 | 8/2009 | Sustaeta et al. |
| 2009/0204237 | A1 | 8/2009 | Sustaeta et al. |
| 2009/0204245 | A1 | 8/2009 | Sustaeta et al. |
| 2009/0204267 | A1 | 8/2009 | Sustaeta et al. |
| 2009/0210081 | A1 | 8/2009 | Sustaeta et al. |
| 2009/0228408 | A1 | 9/2009 | Kaushal et al. |
| 2009/0240366 | A1 | 9/2009 | Kaushal et al. |
| 2009/0265025 | A1 | 10/2009 | Brown |
| 2010/0010654 | A1 | 1/2010 | de Kleer et al. |
| 2010/0138026 | A1 | 6/2010 | Kaushal et al. |

OTHER PUBLICATIONS

EP Search Report, Sep. 10, 2009.

Rui Abreu, Peter Zoeteweij, and Arjan J.C. Van Gemund, "An Evaluation of Similarity Coefficients for Software Fault Localization", 2006 IEEE.

Johan Dekleer and Brian C.Williams, "Diagnosing Multiple Faults", Artificial Intelligence, Apr. 1987, No. 1, Amsterdam, The Netherlands.

Do, "Partial Satisfaction (Over-Subscription) Planning as Heuristic Search," 2004, Proceedings of KBCS-04.

de Kleer, "Diagnosing Multiple Faults," 1987, Artificial Intelligence, vol. 32, pp. 97-130.

Hamscher, "Issues in Model Based Troubleshooting," 1987, MIT A.I. Lab Memo 893.

Wu, "Scheduling with uncertain durations: generating B-robust scheduled using constraint programming.,"ICAPS 2006 Workshop on Constraint Satisfaction Techniques for Planning and Scheduling Problems, pp. 134-137.

Do, "Sapa: A Scalable Multi-objective Heuristic Metric Temporal Planner,"2003, Journal of Artificial Intelligence Research, pp. 155-194.

Do, "Improving the Temporal Flexibility of Position Constrained Metric Temporal Plans,"2003, Proceedings of ICAPS '03, pp. 42-51.

de Kleer, "Fundamentals of Model-Bsed Diagnosis,"2003, Proceedings of the 5th IFAC Symposium on Fault Detection, Supervision, and Safety of Technical Processes, pp. 25-36.

van den Briel, "Effective Approaches for Partial Satisfaction (Over-Subscription) Planning,"2004, In Ninteenth National Conference on Artificial Intelligence (AAA1), pp. 562-569.

Bacchus, "Graphical models for preference and utility," 1995, In Proceedings of UAI.

Smith, "Choosing Objectives in Over-Subscription Planning," 2004, Proceedings of ICAPs-04, pp. 393-401.

Hoffman, "FF: The fast-forward planning system," 2001, A1 Magazine, vol. 22, No. 3, pp. 57-62.

Provan, Model-Based Diagnosis and Control Reconfiguration for Discrete Event Systems: An Integrated Approach, 1999, Proceedings of the 38th Conference on Decision & Control, pp. 1762-1768.

Ruml, "On-line Planning and Scheduling for High-speed Manufacturing," 2005, ICAPS, pp. 30-39.

Verron, "A New Procedure Based on Mutual Information for Fault Diagnosis of Industrial Systems," published in Workshop on Advanced Control and Diagnosis, 2006.

EP Search Report, EP 09 16 4977, Sep. 25, 2009.

Lukas Kuhn, Tim Schmidt, Bob Price, Johan De Kleer, Rong Zhou and Minh Do, "Heuristic Search for Target-Value Path Problem", Palo Alto Research Center.

Arora, R.; and Hsiao, M.S., "Enhancing SAT-based Bounded Model Checking Using Sequential Logic Implications", Aug. 2004, 17th Intl Conference on VLSI Design, ISBN 0-765-2072-3, IEEE Xplore Digital Library.

Basu, S. and Kumar, R., "Quotient-Based Control Synthesis for Partially Observed Non-Deterministic Plants with Mu-Calculus Specifications", Dec. 2007, Proceedings of the 46th IEEE Conference on Decision and Control, ISBN 1-4244-1498-9, IEEE Xplore Digital Library.

Darwiche, A., "Decomposable Negation Normal FOrm", Jul. 2001, Journal of the ACM, vol. 48, No. 4, pp. 608-647.

Deng, S.; Bian, J.; Wu, W.; Yang, X.; and Zhao, Y.; "EHSAT: an Efficient RTL Satisfiability Solver Using an Extended DPLL Procedure", Jun. 2007, Design Automation Conference 2007, ACM Online.

Elliot, P., "An Efficient Projected Minimal Conflict Generator for Projected Prime Implicate and Implicate Generation", Feb. 2004, Massachusetts Institute of Technology, Department of Aeronautics and Astronautics.

Gopalakrishnan, S; Durairaj, V. and Kall, P., "Integrating CNF and BDD Based SAT Solvers", Nov. 2003, 8th IEEE Intl High-Level Design Validation and Test Workshop, ISBN 0-7803-8236-6, IEEE Xplore Digital Library.

Thittamaranahalli, S.K., "Contributions to Algorithmic Techniques in Automated Reasoning About Physical Systems", Mar. 2005, Stanford University, Department of Computer Science.

Voronov, A. and Akesson, K., "Supervisory Control Using Satisfiablity Solvers", May 2008, Proceedings for the 9th Intl Workshop on Discrete Event Systems, ISBN 1-4244-2593-8, IEEE Xplore Digital Library.

Vahidi, A.; Fabian, M. and Lennartson, B., "Generic Resource Booking Models in Flexible Cells", Sep. 2001, Proceedings of the 2001 IEEE Intl Symposium on Intelligent Control, ISBN 0-783-6722-7, IEEE Xplore Digital Library.

Minh Do and Wheeler Ruml, "Lessons Learned in Applying Domain-Independent Planning to High-Speed Manufacturing", Palo Alto Research Center, 2006.

Richard Dearden and Dan Clancy, "Particle Filters for Real-Time Fault Detection in Planetary Rovers", Research Institute for Advanced Computer Science, NASA Ames Research Center.

Patrick Haslum and Hector Geffner, "Heuristic Planning with Time and Resources", Department of Computer Science, Linkoping University, Sweden, Departmento de Computacion, Universidad Simon Bolivar, Venezuela.

Markus P.J. Fromherz, Daniel G. Bobrow, and Johan De Kleer, "Model-based computing for Design Control of Reconfigurable Systems", Palo Alto Research Center, Published in AL Magazine, Special Issue on Qualitative Reasoning, vol. 24, n. 4, 2003 pp. 120-130.

Roberto Cervoni, Amedeo Cesta, an Angelo Oddi, "Managing Dynamic Temporal Constraint Networks", National Research Council of Italy.

Rina Dechter and Judea Pearl, "Generalized Best-First Search Strategies and the Optimality of A", University of California, Los Angeles, California, Journal of the Association for Computing Machinery, vol. 32, No. 3, Jul. 1985, pp. 505-536.

EP Search Report, 10 15 6820.2, Aug. 7, 2010.

EP Search Report, 09 16 4978.0, Sep. 16, 2009.

Peter E. Hart, "A formal basis for the heuristic determination of minimum cost paths", IEE Transactions of Systems Science and Cybernetics, SSC-4, No. 2, Jul. 1968.

Markus P.J. Fromherz, Daniel G. Bobrow, and Johan De Kleer, "Model-based Computing for Design and Control of Reconfigurable Systems", Palo Alto Research Center, Published in AI Magazine, Special Issue on Qualitative Reasoning, vol. 24, No. 4, 2003, pp. 120-130.

Minh Do and Wheeler Ruml, Lessons Learned in Applying Domain-Independent Planning to High-Speed Manufacturing, 2006.

Roberto Cervoni, Amedeo Cesta, and Angelo Oddi, "Managing Dynamic Temporal Constraint Networks", National Research Council of Italy.

Peter E. Hart, Nils J. Nilsson, and Bertram Raphael, "A Formal Basis for the Heuristic Determination of Minimum Cost Paths", IEEE Transactions of Systems Science and Cybernetics, vol. ssc-4, No. 2, Jul. 1968.

Arash Vahidi, Martin Fabian, Bengt Lennartson, "Generic Resource Booking Models in Flexible Cells", Control and Automation Laboratory Department of Signals and Systems, Chalmers University of Technology, 2001 IEEE.

* cited by examiner

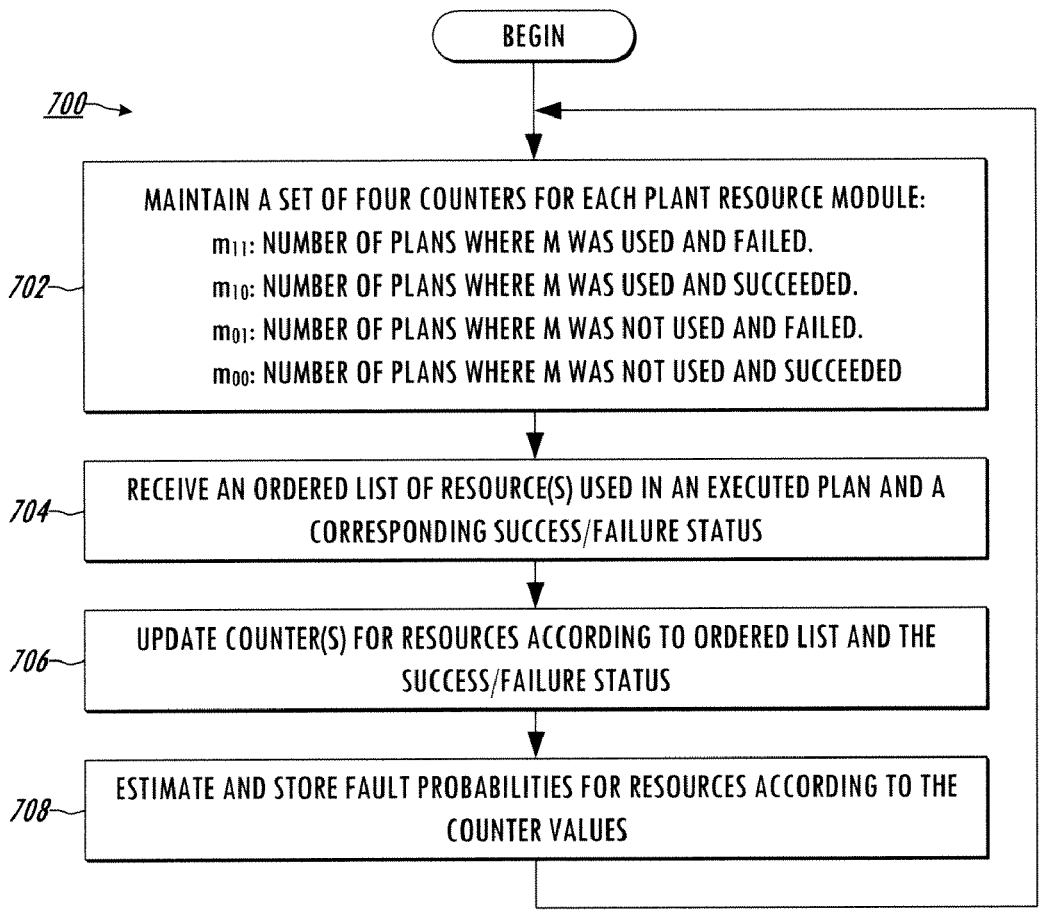
FIG. 8
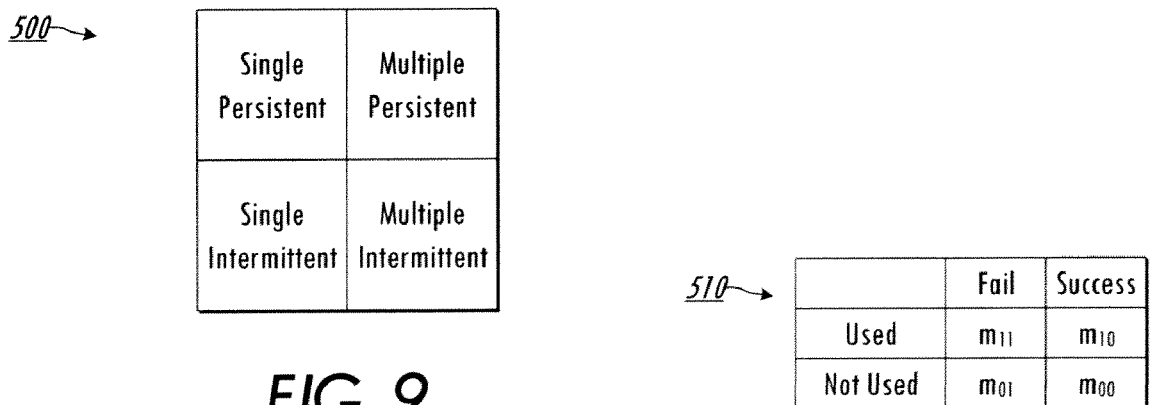
FIG. 9
FIG. 10

| U \ O | Fail | Success |
|---|---|---|
| Used | 1 | 0 |
| Not Used | 0 | 1 |

$$P(O \mid M = m, U)$$

| t | m = A | m = B | m = C | m = D | m = E | m = F |
|---|---|---|---|---|---|---|
| 0 | $10^{-10}$ | $10^{-10}$ | $10^{-10}$ | $10^{-10}$ | $10^{-10}$ | $10^{-10}$ |
| 1 | 1/6 | 1/6 | 1/6 | 1/6 | 1/6 | 1/6 |
| 2 | 0 | 0 | 0 | 1/3 | 1/3 | 1/3 |
| 3 | 0 | 0 | 0 | 1 | 0 | 0 |

| U \ O | Fail | Success |
|---|---|---|
| Used | $\frac{m_{11}}{m_{11}+m_{10}}$ | $\frac{m_{10}}{m_{11}+m_{10}}$ |
| Not Used | 0 | 1 |

$P(O \mid M = m, U)$

FIG. 14

| t | m = A | m = B | m = C | m = D | m = E | m = F |
|---|---|---|---|---|---|---|
| 0 | $10^{-10}$ | $10^{-10}$ | $10^{-10}$ | $10^{-10}$ | $10^{-10}$ | $10^{-10}$ |
| 1 | 1/6 | 1/6 | 1/6 | 1/6 | 1/6 | 1/6 |
| 2 | 1/15 | 1/15 | 1/15 | 4/15 | 4/15 | 4/15 |
| 3 | 1/9 | 1/9 | 1/9 | 4/9 | 1/9 | 1/9 |
| 4 | 16/107 | 16/107 | 16/107 | 27/107 | 16/107 | 16/107 |
| 10 | .16 | .16 | .16 | .18 | .16 | .16 |

FIG. 15

| t | m = A | m = B | m = C | m = D | m = E | m = F |
|---|---|---|---|---|---|---|
| 2001 | 0 | .2 | .3 | .3 | .2 | 0 |
| 4002 | 0 | 0 | 0 | .7 | .3 | 0 |
| 6003 | 0 | 0 | 0 | .77 | .23 | 0 |
| 8004 | 0 | 0 | 0 | .83 | .17 | 0 |
| 16008 | 0 | 0 | 0 | .96 | .04 | 0 |

FIG. 16

| n | $d_{11}$ | $d_{10}$ | candidates |
|---|---|---|---|
| 1 | 1 | 2 | D |
| 14 | 1 | 3 | A  AB  AC  AD  B  BC  BD  C  CD  DE  E  EF  F |
| 6 | 1 | 4 | AE  AF  BE  BF  CE  CF |

| n | p | candidates |
|---|---|---|
| 1 | 0.22 | D |
| 5 | .016 | A  B  C  E  F |
| 9 | $1.6 \times 10^{-10}$ | AB  AC  AD  BC  BD  CD  DE  DF  EF |
| 6 | $1.2 \times 10^{-10}$ | AE  AF  BE  BF  CE  CF |

METHODS AND SYSTEMS FOR CONTINUOUSLY ESTIMATING PERSISTENT AND INTERMITTENT FAILURE PROBABILITIES FOR PRODUCTION RESOURCES

REFERENCE TO RELATED APPLICATION

This application claims priority to and the benefit of U.S. Provisional Patent Application Ser. No. 61/079,456, which was filed Jul. 10, 2008, entitled HEURISTIC SEARCH FOR TARGET-VALUE PATH PROBLEM, and claims priority to and the benefit of U.S. Provisional Patent Application Ser. No. 61/098,392, which was filed Sep. 19, 2008, entitled METHODS AND SYSTEMS FOR CONTINUOUSLY ESTIMATING PERSISTENT AND INTERMITTENT FAILURE PROBABILITIES FOR PRODUCTION RESOURCES, the entireties of which applications are hereby incorporated by reference.

BACKGROUND

The present exemplary embodiments relate to automated diagnosis of resources in production systems having multiple resources for achieving production goals. Diagnosing system performance and component status can advantageously aid in improving productivity, identifying faulty or underperforming resources, scheduling repair or maintenance, etc. Accurate diagnostics requires information about the true condition of components in the production system. Such information can be obtained directly from sensors associated with individual components and/or may be inferred from a limited number of sensor readings within the production plant using a model or other knowledge of the system structure and dynamics. However, providing complete sensor coverage for all possible system faults can be expensive or impractical in harsh production environments. Thus, a need remains for improved diagnostic techniques and systems by which the probabilities of production resources being faulty can be ascertained without requiring complete sensor coverage.

BRIEF DESCRIPTION

The present disclosure provides production control systems and methods for estimating failure probabilities for single or multiple, persistent or intermittent faults in a production system having multiple production resources. In accordance with one or more aspects of the disclosure, a self-diagnosing production control system is provided for controlling the operation of a production system to achieve one or more production goals and to diagnose the failure status of resources in the production system. The control system includes a planner operatively coupled with the production system to provide plans for execution in the production system, a plant model operatively coupled with the planner and including a model of a plant of the production system, and a diagnosis engine with a belief model and a plant condition estimation component. The belief model includes a current fault probability value for single or multiple, persistent or intermittent faults for each of the resources in the production system. The plant condition estimation component maintains count values for each production resource, including a first count value $m_{11}$ indicating a number of plans where the resource m was used and failed, a second count value $m_{10}$ indicating a number of plans where the resource m was used and succeeded, a third count value $m_{01}$ indicating a number of plans where the resource m was not used and failed, and a fourth count value $m_{00}$ indicating a number of plans where the resource m was not used and succeeded.

As each production plan is executed in the production system, the estimation component is provided with a list of the resources used in the plan executed as well as an indication of whether the plan succeeded or failed. Based on this, one of the four count values is incremented, and the current fault probability value is estimated for each resource based on the corresponding count values for single persistent faults, multiple persistent faults, single intermittent faults, and/or multiple intermittent faults. The current fault probability values for the resources are then stored for use by a model-based planner that constructs and schedules production jobs or for other purposes, such as diagnosing failed system resources, maintenance scheduling, etc. The plant condition estimation component in certain implementations may also initialize the probability values to a predetermined value before execution of any plans in the production system, and may multiply each count value by a weighting factor less than 1 after estimating the current fault probability value.

In one implementation for a single persistent fault, the plant condition estimation component may estimate the resource fault probability by exonerating the resource by setting the current fault probability to zero if the second or third count values $m_{10}$ or $m_{01}$ are greater than zero, and otherwise, setting the current fault probability to 1/X, where X is the number of resources where both the second and third count values $m_{10}$ and $m_{01}$ are zero. For an assumed single intermittent fault, the estimation component in one implementation estimates fault probability value to exonerate the resource by setting the current fault probability to zero if the third count value $m_{01}$ is greater than zero, and otherwise sets the current fault probability according to the equation $\alpha w p_0(M)$, where $\alpha$ is a value selected so that the posterior fault probabilities for all the resources sum to 1, where w is determined according to the following equation:

$$w = \left[\frac{m_{10}}{m_{11}+m_{10}}\right]^{m_{10}} \left[\frac{m_{11}}{m_{11}+m_{10}}\right]^{m_{11}},$$

where $p_0(M)$ is the prior fault probability value.

Fault probabilities for multiple persistent faults can be estimated by establishing a plurality of unique diagnoses d to be evaluated, at least one of the diagnoses including a single one of the resources m, and at least one of the diagnoses including at least two of the resources m, with each diagnosis having a unique assignment of either good or faulted to each member resource. One method in this case further includes maintaining a set of four diagnosis count values for each diagnosis, the four diagnosis count values for each individual diagnosis including a first diagnosis count value $d_{11}$ indicating a number of failed plans where a bad resource of the diagnosis d was used, a second diagnosis count value $d_{10}$ indicating a number of successful plans where a bad resource of the diagnosis d was used, a third diagnosis count value $d_{01}$ indicating a number of failed plans where a good resource of the diagnosis d was not used, and a fourth diagnosis count value $d_{00}$ indicating a number of successful plans where a good resource of the diagnosis d was not used. Resources of a given diagnosis are exonerated by setting the current fault probability for that diagnosis to zero if the second or third diagnosis count values $d_{10}$ or $d_{01}$ are greater than zero, and otherwise, a current diagnosis fault probability is set to 1/X, where X is the number of diagnoses where both the second and third diagnosis count values $d_{10}$ and $d_{01}$ are zero. The method also includes setting the current fault probability for the evaluated resources according to the following equation:

$$p(m \mid o_1, \ldots, o_t) = \sum_{d \text{ s.t. } m \in d} p(d \mid o_1, \ldots, o_t).$$

In another embodiment, fault probabilities for multiple intermittent faults are estimated by maintaining the diagnosis count values for each diagnosis, and maintaining a list of remaining suspect candidate diagnoses (d's) for which the third diagnosis count value $d_{01}$ is zero, and setting a posterior fault probability for the evaluated resources according to the following equation:

$$p(m \mid o_1, \ldots, o_t) = \sum_{d \text{ s.t. } m \in d} p(d \mid o_1, \ldots, o_t).,$$

where m is the resource, $o_1, \ldots o_t$ is a set of observations, the d's are drawn from remaining set of suspect candidates resources for which the third count value $d_{01}$ is zero.

In yet another embodiment, fault probabilities for multiple intermittent faults are estimated by maintaining a counter value $i_{11}$ associated with each set of modules m utilized in a failing plan I, computing a failure term for the evaluated resources using the counter value $i_{11}$ according to the following equation:

$$\Pi_{U fails}[1-\Pi_{m \in bad(D) \cap U}(1-p_b(m))] = \Pi_{i \in I}[1-\Pi_{m \in bad(D)} \cap i(1-p_b(m))]^{i_{11}},$$

where I is a set of all such sets which have failed at least once, where m is the resource, and where $p_b(m)$ is the probability that a resource m produces an incorrect output when faulted. The multiple intermittent fault probability estimation further includes computing a success term for the evaluated resources using the counter $m_{10}$ for each resource according to the following equation:

$$\prod_{U \text{ succeeds}} \prod_{m \in bad(d) \cap U} (1 - p_b(m)) = (1 - p_b(m))^{m_{10}}.,$$

and setting a posterior fault probability for the evaluated resources according to the following equation:

$$p_t(D \mid O, U) = \begin{cases} \prod_U \text{fails} \left[1 - \prod_{m \in bad(D) \cap U}(1 - p_b(m))\right] \\ \prod_U \text{succeeds} \prod_{m \in bad(D) \cap U}(1 - p_b(m)), \end{cases}$$

where O is a set of observations and U is an indication of whether the module was used in the plan associated with the observation O.

In accordance with other aspects of the disclosure, a method is provided for estimating production system resource failure probabilities. The method includes maintaining a set of count values for each production resource, where the count values include a first count value $m_{11}$ indicating a number of plans where the resource m was used and failed, a second count value $m_{10}$ indicating a number of plans where the resource m was used and succeeded, a third count value $m_{01}$ indicating a number of plans where the resource m was not used and failed, and a fourth count value $m_{00}$ indicating a number of plans where the resource m was not used and succeeded. The method further includes incrementing a select one of the count values for each of the resources based on the success or failure of the plan and a list of resources used in each plan, estimating a current fault probability value for each resource based on the count values for single or multiple, persistent or intermittent faults, and storing the resource fault probability values.

In accordance with still other aspects of the disclosure, a computer readable medium is provided, which has computer executable instructions for performing the steps of maintaining a set of four count values for each of a plurality of resources in a production system, for each plan executed in the production system, incrementing a select one of the count values for each of the resources based on a list of resources used in the plan and the success or failure of the plan, for each resource, estimating a current fault probability value for single or multiple, persistent or intermittent faults based on at least one of the corresponding set of count values, and storing the current fault probability values for the resources.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

FIG. 8 is a flow diagram illustrating an exemplary method of estimating failure probabilities for resources in a production system in accordance with one or more aspects of the present disclosure;

FIG. 9 is a schematic illustration of a number of possible production resource fault types in the production system of FIGS. 1 and 3;

FIG. 10 is a schematic diagram illustrating four exemplary counter values maintained by the plant condition estimation component in FIGS. 1 and 3 for each production resource in the production system in accordance with the disclosure;

FIG. 14 is a schematic diagram illustrating an exemplary observation function for single intermittent faults in the condition estimation component in FIGS. 1 and 3;

FIGS. 15 and 16 are tables illustrating posterior resource fault probability values for the exemplary single intermittent fault case in the system of FIG. 12;

FIGS. 19 and 20 are tables illustrating diagnosis and posterior resource fault probability values for the exemplary multiple persistent fault case in the system of FIG. 12;

DETAILED DESCRIPTION

Figure 1:
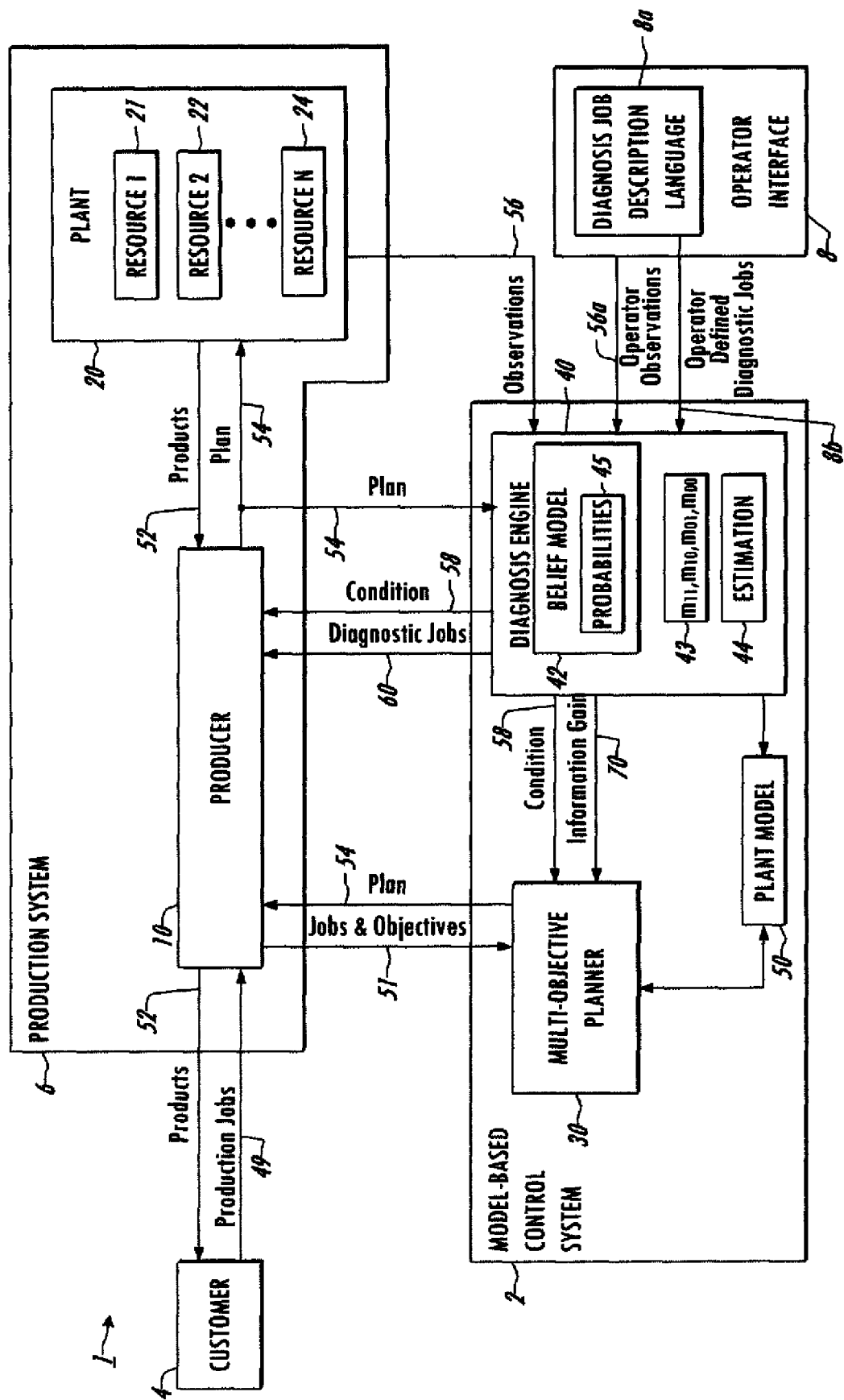
FIG. 1 is a schematic diagram illustrating a production system and an exemplary model-based production control system with a planner, a plant model, and a diagnosis engine with a belief model including a current fault probability values for production resources and a plant condition estimation component for estimating the fault probabilities in accordance with one or more aspects of the disclosure.

Referring now to the drawing figures, several embodiments or implementations of the present disclosure are hereinafter described in conjunction with the drawings, wherein like reference numerals are used to refer to like elements throughout, and wherein the various features, structures, and graphical renderings are not necessarily drawn to scale.

The disclosure relates to automated diagnosis of resource fault conditions and estimation of resource fault probabilities in production systems generally and is hereinafter illustrated and described in the context of exemplary document processing systems having various printing and document transport resources or modules. The disclosed concepts also find utility in association with product packaging systems and any other type or form of system in which a plurality of resources, whether machines, humans, software or logic components, objects, etc., may be selectively employed according to plans comprised of a series of actions to achieve one or more production goals, wherein all such alternative or variant implementations are contemplated as falling within the scope of the present disclosure and the appended claims. The disclosure finds particular utility in identifying production resources or operating modes thereof that are suspected of being faulty so as to facilitate construction and scheduling of plans in systems in which a given production goal can be achieved in two or more different ways, including use of different resources (e.g., two or more print engines that can each perform a given desired printing action, two different substrate routing paths that can be employed to transport a given printed substrate from one system location to another, etc.), and/or the operation of a given system resource at different operating parameter values (e.g., operating substrate feeding components at different speeds or in different directions, operating print engines at different voltages, temperatures, speeds, etc.).

Figure 2:
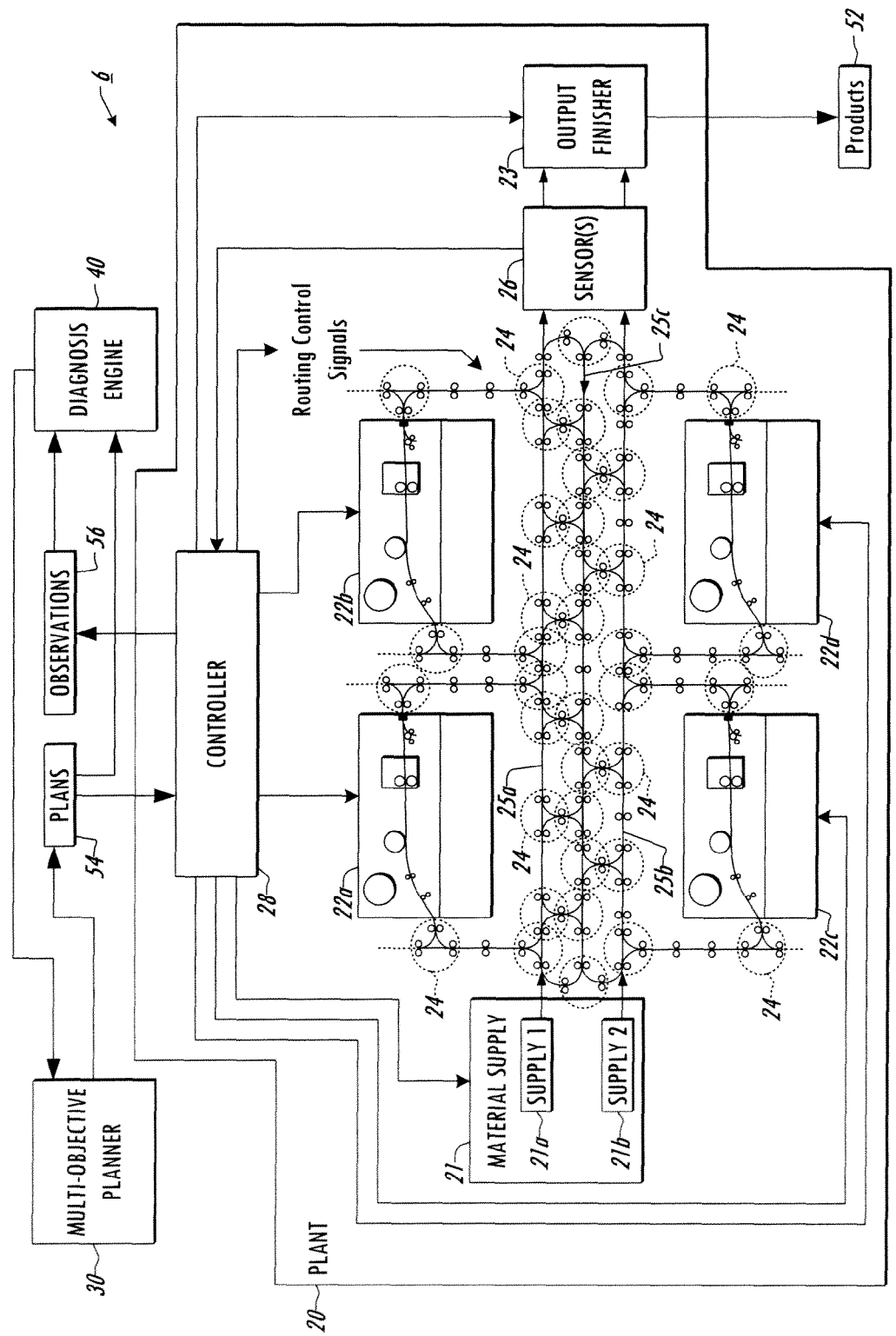
FIG. 2 is a schematic diagram illustrating further details of an exemplary modular printing system plant in the production system of FIG. 1.
Figure 3:
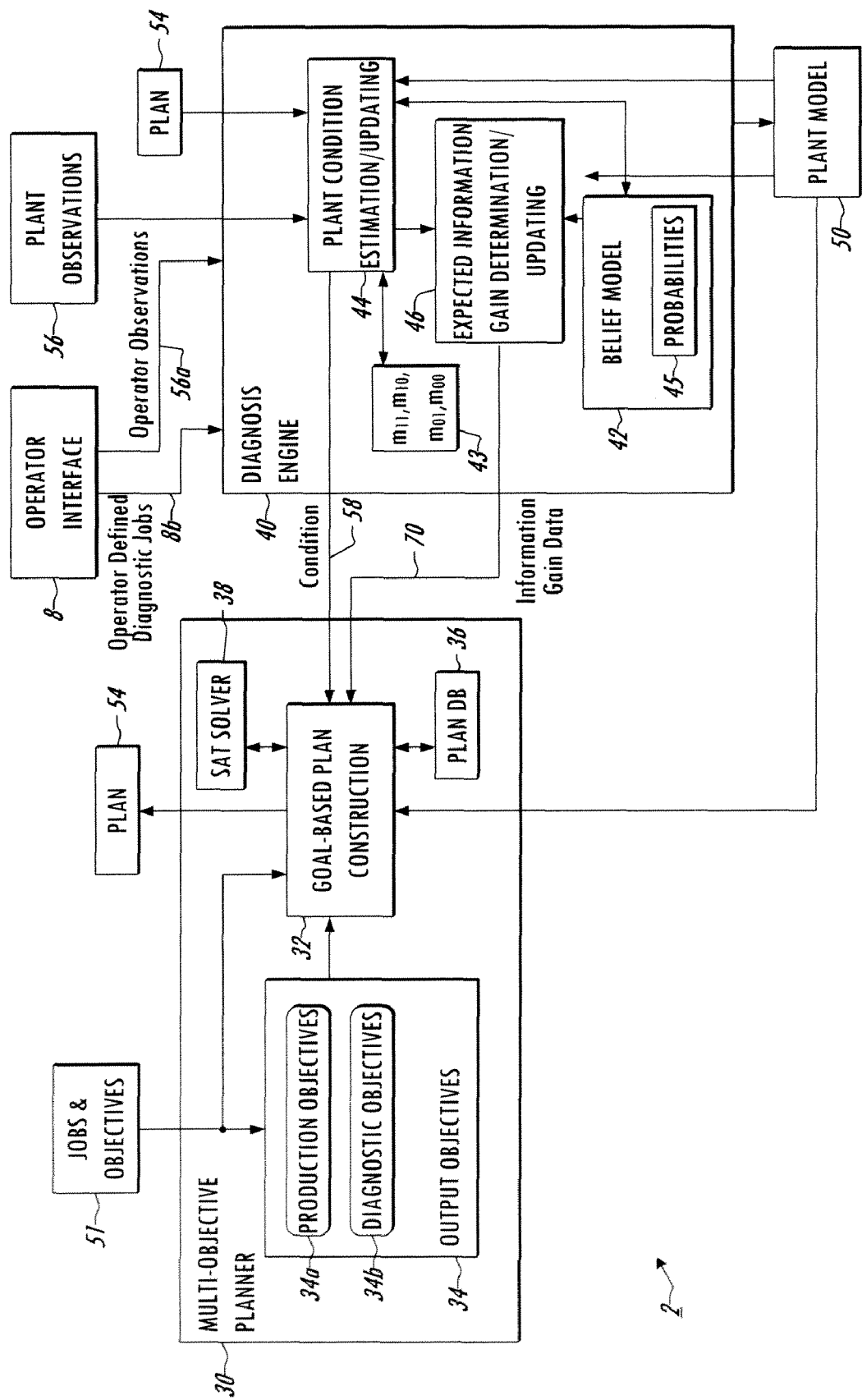
FIG. 3 is a schematic diagram illustrating further details of the exemplary planner and diagnosis engine in the production control system of FIGS. 1 and 2.

FIGS. 1-3 illustrate an exemplary system 1 in which the various aspects of the present disclosure may be implemented. As best shown in FIG. 1, a production system 6 is illustrated including a producer component 10 that receives production jobs 49 from a customer 4 and a plant 20 having a plurality of resources 21-24 that may be actuated or operated according to one or more plans 54 so as to produce one or more products 52 for provision to the customer 4 by the producer 10, where 'producing' products can include modifying products, objects, etc., including without limitation packaging or wrapping products, printing and transferring paper or other printable substrates, etc. FIG. 2 illustrates further details of one exemplary plant 20 and FIG. 3 shows additional details regarding the exemplary model-based control system 2 with a diagnosis engine 40 in accordance with the present disclosure. The producer 10 manages one or more plants 20 which actually produce the output products 52 to satisfy customer jobs 49. The producer 10 in this embodiment provides jobs and objectives 51 to a multi-objective planner 30 of the model-based control system 2 and the production system 6 receives plans 54 from the planner 30 for execution in the plant 20. The jobs 54 can include one or both of production and diagnostic goals.

As shown in FIGS. 1 and 3, the control system 2 further includes a plant model 50 providing a model of the components and operation of the plant 20, and a diagnosis engine 40. The diagnosis engine maintains a belief model 42 including fault probabilities 45 for each of the plant resources 21-24, as well as a series of four counter values $m_{11}$, $m_{10}$, $m_{01}$, and $m_{00}$ for each of the resources 21-24, and a plant condition estimation/updating component 44 for updating the belief model 42 and the resource fault probability values 45 in accordance with various aspects of the disclosure. The four count values for each individual resource include a first count value $m_{11}$ indicating a number of plans where the resource m was used and failed, a second count value $m_{10}$ indicating a number of plans where the resource m was used and succeeded, a third count value $m_{01}$ indicating a number of plans where the resource m was not used and failed, and a fourth count value $m_{00}$ indicating a number of plans where the resource m was not used and succeeded.

In operation, the diagnosis engine 40 determines and updates a current plant condition 58 via the plant condition estimation/updating component 44 based on one or more previously executed plans 54, corresponding observations 56 from the plant 20, and the model 50, and provides expected information gain data 70 to the planner 30 for one or more possible plans 54 based on the current plant condition 58 and the model 50. For each plan 54 executed in the production system 6, the diagnosis engine 30 receives an indication of the success or failure thereof, as well as an ordered listing of the resources used in the plan. Based on this, the estimation component 44 increments the appropriate one of the count values $m_{11}$, $m_{10}$, $m_{01}$, and $m_{00}$ for each of the resources (for unused and used resources) based on the used resources list and the success or failure of the plan 54. Using one or more of the count values $m_{11}$, $m_{10}$, $m_{01}$, and $m_{00}$, a current fault probability value is estimated by the estimation component 44 for each resource 21-24 for single or multiple, persistent or intermittent faults, and stores the fault probability values for the resources, for example, in a memory integrated into or operatively coupled with the diagnosis engine 40. In one embodiment, the probability values are initialized to zero or some predetermined value (e.g., $10^{-10}$) prior to execution of any plans 54 in the production system 6. Moreover, the count values are multiplied by a weighting factor λ after estimating the current fault probability value in certain implementations, where λ is less than 1 (e.g., λ=0.99999 in one example).

The operator observations 56a from the interface 8 may also be used to supplement the estimation and updating of the current plant condition including the resource fault probabilities by the component 44. The estimation component 44 provides the condition information 58 to inform the planner 30 of the confirmed or suspected condition of one or more resources 21-24 or other components of the plant 20, and the planner 30 may utilize this information 58 in providing plans 54 for implementing a given production job or goal 51, in consideration of production objectives 34a and diagnostic objectives 34b. The diagnosis engine 40 also includes a component 46 that provides expected information gain data 70 to the planner 30 based on the model 50 and the belief model 42. The exemplary system 1 also includes an optional operator interface 8 (FIG. 1) coupled with the diagnosis engine 40 to provide operator observations 56a to the diagnosis engine 40, with the diagnosis engine 40 determining the current plant condition 58 based at least partially on the operator observations 56a in certain implementations. The operator interface 8 may also allow an operator to define a diagnostic job 8b using a diagnosis job description language 8a, and the diagnosis engine 40 may provide diagnostic jobs 60 to the producer 10. The diagnosis engine 40 in this implementation is operative to selectively provide one or more self-generated diagnostic jobs 60 and/or operator defined diagnostic jobs 8b to the producer 10, which in turn provides jobs and objectives 51 to the planner 30. The information gain data 70 may optionally be determined in consideration of the operator defined diagnostic jobs 8b from the operator interface 8.

The model-based control system 2 and the components thereof may be implemented as hardware, software, firmware, programmable logic, or combinations thereof, and may be implemented in unitary or distributed fashion. In one possible implementation, the planner 30, the diagnosis engine 40, and the model 50 are software components and may be implemented as a set of sub-components or objects including computer executable instructions and computer readable data executing on one or more hardware platforms such as one or more computers including one or more processors, data stores, memory, etc. The components 30, 40, and 50 and sub components thereof may be executed on the same computer or in distributed fashion in two or more processing components that are operatively coupled with one another to provide the functionality and operation described herein. Likewise, the producer 10 may be implemented in any suitable hardware, software, firmware, logic, or combinations thereof, in a single system component or in distributed fashion in multiple interoperable components. In this regard, the control system 2 may be implemented using modular software components (e.g., model 50, planner 30, diagnosis engine 40 and/or sub-components thereof) to facilitate ease of debugging and testing, the ability to plug state of the art modules into any role, and distribution of operation over multiple servers, computers, hardware components, etc.

Referring to FIGS. 2 and 3, the planner 30 provides one or more plans 54 to the production system 6 for execution in the plant 20 based on at least one output objective 34 (FIG. 3) and production goals as directed by the incoming jobs 51 from the producer 10. As shown in FIG. 3, the planner 30 selectively factors in one or more output objectives 34 derived from the jobs and objectives 51 in constructing plans 54 including production objectives 34a and diagnostic objectives 34b. In one possible implementation, the production objectives 34a are created and updated according to the jobs and objectives 51 obtained from the production system 6, and the diagnostic objectives 34b are derived from, and updated according to, the current plant condition 58 and the expected information gain data 70 provided by the diagnosis engine 40. The production objectives 34a in one implementation may relate to the scheduling of orders for produced products 52 (FIG. 1), and may include prioritization of production, minimization of inventory, and other considerations and constraints driven in large part by cost and customer needs. Examples of production objectives 34a include prioritizing plan construction/generation with respect to achieving a given product output goal (simple production criteria) as well as a secondary consideration such as simple time efficient production, cost efficient production, and robust production. For instance, cost efficient production objectives 34a will lead to construction/generation of plans 54 that are the most cost efficient among the plans that met the production goal as dictated by the jobs 51 received from the producer 10. The diagnostic objectives 34b may include objectives related to determining preferred action sequences in generated plans 54 for performing a given production-related task, minimization of maintenance and repair costs in operation of the plant 20, identifying resources 21-24 causing intermittent or persistent faults, etc. As further shown in FIG. 3, the control system 2 may optionally include a plan data store or database 36 used to store plans 54 selectable by the planner 30 for execution in the plant 20 to facilitate one or more production or diagnostic objectives 34. Alternatively or in combination, the planner 30 can synthesize (e.g. construct or generate) one or more plans 54 as needed, using the plant model 50 and information from the producer 10 and diagnosis engine 40 to determine the states and actions required to facilitate a given production and/or diagnostic objectives 34.

The planner 30 creates and provides plans 54 for execution in the plant 20. The plans 54 include a series of actions to facilitate one or more production and/or diagnostic objectives 34 while achieving a production goal according to the jobs 51, and in which a given action may appear more than once. The actions are taken with respect to states and resources 21-24 defined in the model 50 of the plant 20, for example, to route a given substrate through a modular printing system 20 from a starting state to a finished state as shown in FIG. 2. In operation, the planner 30 generates or constructs a plan 54 that will achieve a given production goal at least partially based on a diagnostic objective 34b and the expected information gain data 70 from the diagnosis engine 40. The planner 30 in the illustrated embodiment includes a goal-based plan construction component 32 that assesses the current plant condition 58 from the diagnosis engine 40 in generating a plan 54 for execution in the plant 20. The component 32 may also facilitate identification of faulty components 21-24 or sets thereof in constructing the plans 54 based on observations 56 and current plant conditions 58 indicating one or more plant components 21-24 as being suspected of causing system faults.

Figure 4:
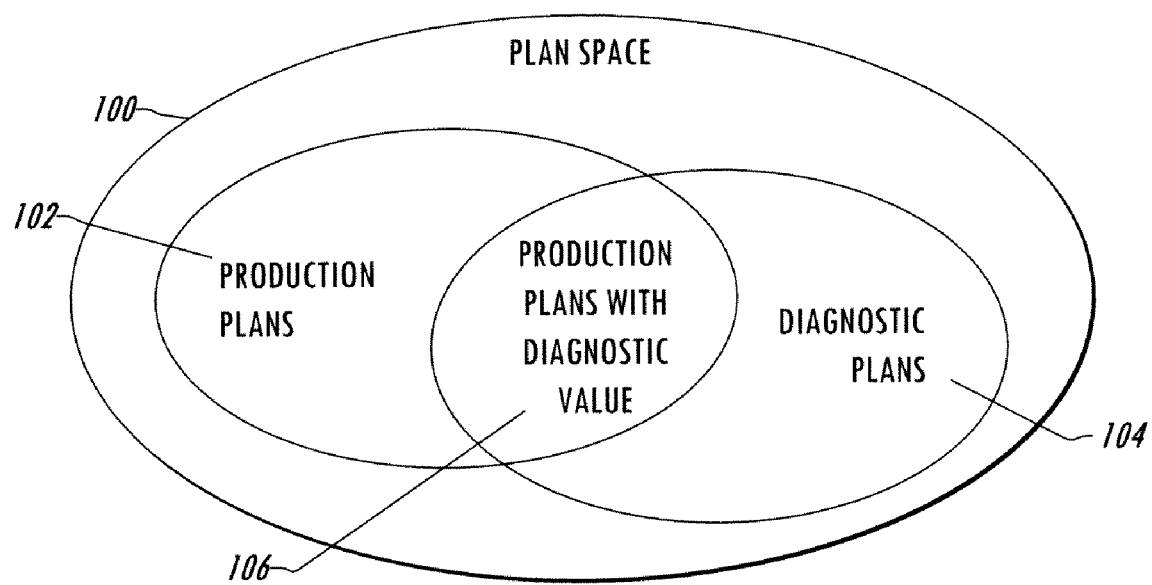
FIG. 4 is a schematic diagram illustrating a plan space for a production system, including production and diagnostic plans.

Referring also to FIG. 4, the planner 30 preferably constructs plans 54 within a plan space 100 that includes both production plans 102 and diagnostic plans 104 to facilitate diagnostic information gain while implementing production. The union of the plan sets 102 and 104 includes production plans 106 that have diagnostic value (e.g., can facilitate one or more diagnostic objectives 34b in FIG. 3), wherein the planner 30 advantageously utilizes information from the diagnosis engine 40 to preferentially construct plans 106 that achieve production goals while obtaining useful diagnostic information in accordance with the diagnostic objectives 34b. The diagnostic information gained, in turn, can be used to improve the long term productivity of the system 6, thereby also facilitating one or more production objectives 34a (FIG. 3).

FIG. 2 illustrates further details of an exemplary modular printing system plant 20 in the production system 6, including a material supply component 21 that provides printable sheet substrates from one of two supply sources 21a and 21b, a plurality of print or marking engines 22, an output finisher station 23, a modular substrate transport system including a plurality of multidirectional substrate transport/router components 24 (depicted in dashed circles in FIG. 2), one or more output sensors 26 disposed between the transport system 24 and the finisher 23, and a controller 28 providing control signals for operating the various actuator resources 21-24 of the plant 20. The exemplary printing system plant 20 includes four print engines 22a, 22b, 22c, and 22d, although any number of such marking engines may be included, and further provides a multi-path transport highway with three multidirectional substrate transport paths 25a, 25b, and 25c, with the transport components 24 being operable by suitable routing signals from the controller 28 to transport individual substrate sheets from the supply 21 through one or more of the marking engines 22 (with or without inversion for duplex two-side printing), and ultimately to the output finishing station 23 where given print jobs are provided as output products 52. Each of the printing engines 22, moreover, may individually provide for local duplex routing and media inversion, and may be single color or multi-color printing engines operable via signals from the controller 28. The model-based control system 2 may, in certain embodiments, be integrated into the plant controller 28, although not a strict requirement of the present disclosure.

In operation, the planner 30 automatically generates plans 54, for example, by piece-wise determination of a series of actions to form a plan and/or by obtaining whole or partial plans 54 from the data store 36 for component resources 21-24 of the printing system plant 20 from a description of output production goals derived from the incoming jobs 51 in consideration of one or more production objectives 34a and diagnostic objectives 34b. In particular, when the plant 20 has flexibility in how the output goals can be achieved (e.g. in how the desired products 52 can be created, modified, packaged, wrapped, etc.), such as when two or more possible plans 54 can be used to produce the desired products 52, the diagnosis engine 40 can alter or influence the plan construction operation of the planner 30 to generate a plan 54 that is expected to yield the most informative observations 56. The additional information gained from execution of the constructed job 54 can be used by the producer 10 and/or by the planner 30 and diagnosis engine 40 to work around faulty component resources 21-24, to schedule effective repair/maintenance, and/or to further diagnose the system state (e.g., to confirm or rule out certain system resources 21-24 as the source of faults previously detected by the sensor(s) 26). In this manner, the information gleaned from the constructed plans 54 (e.g., plant observations 56) can be used by the estimation and updating component 44 to further refine the accuracy of the current belief model 42.

Moreover, where the plant 20 includes only limited sensing capabilities, (e.g., such as the system in FIG. 2 having only sensors 26 at the output of the transport system 24 downstream of the printing engines 22), passive diagnosis is unable to unambiguously identify every possible fault in the system 20, whereas direct diagnostic efforts lead to system downtime and the associated cost in terms of productivity. The control system 2 of the present disclosure, on the other hand, advantageously facilitates selective employment of intelligent on-line diagnosis aided by construction and execution of plans 54 that provide enhanced diagnostic information according to the plant condition 58 and/or the expected information gain 70, and may further advantageously facilitate generation of one or more dedicated diagnostic plans 54 for execution in the plant 20 based on at least one diagnostic objective 34b and the plant condition 58, and for intelligent interleaving of dedicated diagnostic plans 54 and production plans 54 based on production and diagnostic objectives 34 according to the current plant condition 58. In particular, the planner 30 can cause execution of explicit diagnostic plans 54 that involve halting production when the information gained from the plan 70 is expected to lead to significant future gains in productivity, enhanced ability to identify faulty resources 21-24, or other long term productivity objectives 34a and/or diagnostic objectives 34b.

Even without utilizing dedicated diagnostic plans 54, moreover, the control system 6 significantly expands the range of diagnosis that can be done online through pervasive diagnostic aspects of this disclosure during production (e.g., above and beyond the purely passive diagnostic capabilities of the system), thereby lowering the overall cost of diagnostic information by mitigating down time, the number of service visits, and the cost of unnecessarily replacing components 21-24 in the system 20 that are actually working, without requiring complete sensor coverage. The planner 30 is further operative to use the current plant condition 58 in making a tradeoff between production objectives 34a and diagnostic objectives 34b in generating plans 54 for execution in the plant 20, and may also take the condition 58 into account in performing diagnosis in isolating faulty resources 21-24 in the plant 20.

The plant condition estimation and updating component 44 of the diagnosis engine 40 infers the condition of internal components 21-24 of the plant 20 at least partially from information in the form or observations 56 derived from the limited sensors 26, wherein the diagnosis engine 40 constructs the plant condition 58 in one embodiment to indicate both the condition (e.g., normal, worn, broken) and the current operational state (e.g., on, off, occupied, empty, etc.) of the individual resources 21-24 or components of the plant 20. The belief model 42 can be updated accordingly to indicate confidence in the conditions and/or states of the resources or components 21-24. Once the producer 10 has initiated production of one or more plans 54, the diagnosis engine 40 receives a copy of the executed plan(s) 54 and corresponding observations 56 (along with any operator-entered observations 56a). In one example, the plan is in the form of an ordered list of resources used in the plan 54 and the success/failure of the plan 54 is derived from the plant observations 56, 56a. Each such plan can include the routing and processing of a single sheet or substrate through the printing system plant 20 in FIG. 2, and the plans can be implemented concurrently (e.g., with several substrates being in the plant 290 at the same time.

The condition estimation and updating component 44 uses the observations 56, 56a together with the plan 54 and the plant model 50 to infer or estimate the condition 58 of internal components/resources 21-24 and updates the belief model 42 accordingly. The inferred plant condition information 58 is used by the planner 30 to directly improve the productivity of the system 20, such as by selectively constructing plans 54 that avoid using one or more resources/components 21-24 known (or believed with high probability) to be faulty, and/or the producer 10 may utilize the condition information 58 in scheduling jobs 51 to accomplish such avoidance of faulty resources 21-24. The exemplary diagnosis engine 40 also provides future prognostic information to update the diagnostic objectives 34b which may be used by the planner 30 to spread utilization load over multiple redundant components 21-24 to create even wear or to facilitate other long term objectives 34. Moreover, the fault probabilities 45 for the plant resources 21-24 may be employed for a variety of other purposes. The diagnosis engine 40 can also provide prognostic information to the planner 30 to help improve the quality of the plans 54 with respect to certain criteria.

Figure 5:
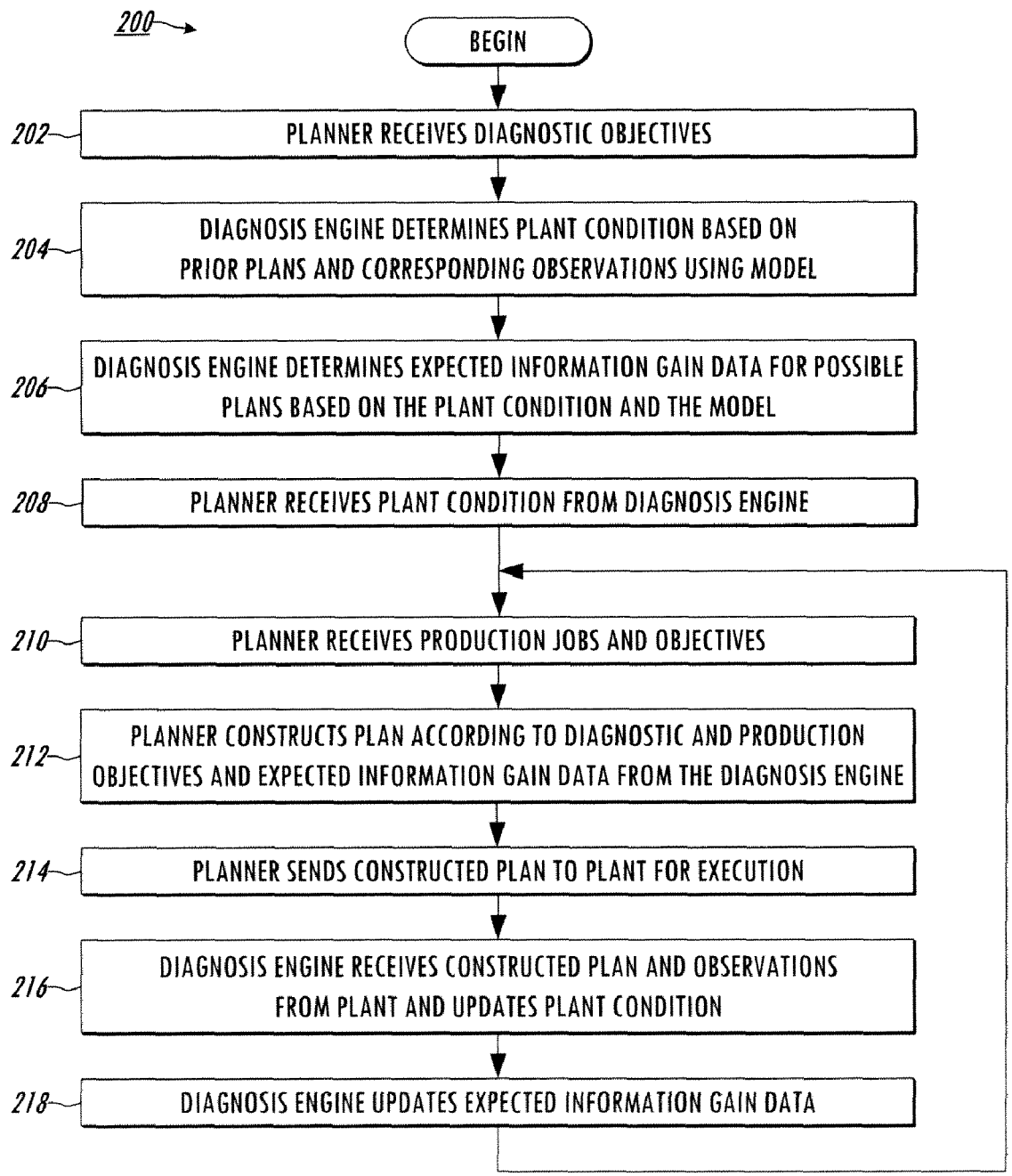
FIG. 5 is a flow diagram illustrating construction of plans for execution in the production system of FIGS. 1 and 3.

FIG. 5 illustrates a diagram 200 showing construction of plans 54 for execution in the production system 6 to achieve one or more production goals. Diagnostic objectives 34*b* are received at 202 and a current plant condition 58 and expected information gain data 70 are determined at 204 based at least partially on a previously executed plan 54 and at least one corresponding observation 56 from the plant 20 using a plant model 50. The planner 30 receives the plant conditions 58 at 208 from the diagnosis engine 40, and receives production jobs and objectives 51 at 210 from the producer 10. At 212, the planner 30 constructs a plan 54 at based at least partially on a diagnostic objective 34*b* and the expected information gain data 70 and sends the constructed plan 54 at 214 to the plant 20 for execution. The diagnosis engine 40 receives the plan 54 and the plant observations 56 at 216, and updates the plant condition 58 and the expected information gain data 70 at 218, after which further jobs and objectives 51 are serviced and the process 200 continues again at 210 as described above.

Figure 6:
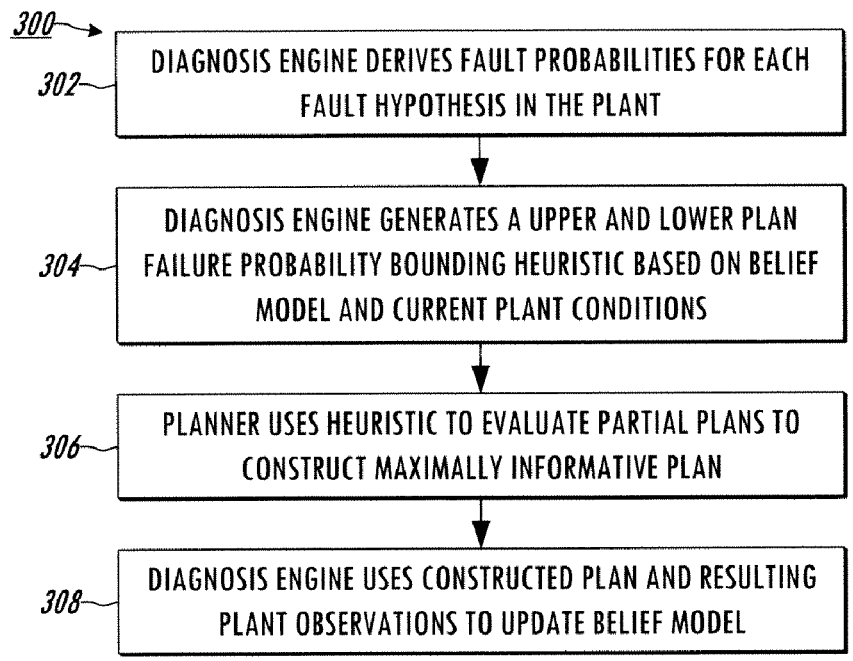
FIG. 6 is a flow diagram illustrating evaluation and generation of plans for execution in the plant.

The planner 30 can employ any suitable technique for constructing plans 54 to enhance diagnostic information gain while achieving production goals, including without limitation using heuristic searches, SAT solvers, etc. FIG. 6 illustrates an exemplary method 300 for evaluating and constructing plans for execution in the plant 20 using A* search. In this embodiment, the estimation component 44 of the diagnosis engine 40 (FIG. 3) establishes and updates beliefs in the belief model 42, including the fault probability values 45 for each production resource 21-25 and updates the plant model 50. At 302, the estimation component 44 derives failure or fault probabilities for each fault hypothesis in the plant 20 and employs dynamic programming at 304 to generate an upper and lower plan failure probability bounding heuristic based on the belief model 42 and the current plant condition 58. At 306, the planner 30 uses the heuristic to evaluate partial plans 54 so as to construct maximally informative plans 54, preferably using an A* search approach. At 308, the diagnosis engine 40 then uses the constructed plan 54 and output observations 56 obtained from execution of the constructed plan 54 in the plant 20 to update the belief model 42.

The diagnosis engine 40 in this approach advantageously provides the inputs for searching by the planner 30 in order to derive valuable information for the diagnosis of the system 20. In this embodiment, the best plans 54 with respect to diagnostic value for single persistent faults are those that have an equal probability of succeeding or failing. The diagnosis engine 40 may advantageously use this notion to develop heuristics to guide the search by the planner 30 in evaluating partial plans 54 to construct the plan 54 to be executed in the plant 20. By this approach, the control system 2 implements efficient on-line active or pervasive diagnosis in controlling the plant 20 through a combination of model-based probabilistic inferences in the diagnosis engine 40 with decomposition of the information gain associated with plan execution using an efficient heuristic target search in the planner 30. In the example of the modular printing system plant 20 of FIG. 2, the planner 30 operates to construct the sequence of actions (plan 54) that transfers substrate sheets through the system 20 to generate a requested output for a given print job (e.g. to satisfy a production goal), using pervasive diagnosis to aid in plan construction. One particular production objective 34*a* in this system 20 is to continue printing even if some of the print engines 22 fail or some of the paper handling modules 24 fail or jam. In this exemplary modular printing system example 20, moreover, there are only output type sensors 26 preceding the finisher 23, and as a result, a plan 54 consisting of numerous actions must be executed before a useful observation 56 can be made. Moreover, the execution of actions of a given plan 54 may result in only a single observable plan outcome or observation O (e.g., observation 56 from sensor 26).

The system's beliefs in the belief model 42 can be represented as a probability distribution over the hypothesis space $H_{sys}$, Pr(H), where the belief model 42 is updated by the diagnosis engine 40 from past observations 56 using Bayes' rule to get a posterior distribution over the unknown hypothesis H given observation O and plan P: $Pr(H|O, P) = \alpha\, Pr(O|H, P)\, Pr(H)$. Regarding plan selection/construction priorities in the context of diagnostic information value, an informative plan 54 reduces the uncertainty of the system's beliefs 42, and thus plans 54 with outcomes that are hard to predict are the most informative, while execution of plans 54 that are known to succeed (or known to fail) will yield no diagnostic information gain. Thus, the exemplary planner 30 attempts to create informative plans to facilitate diagnostic information gain, although the various fault estimation techniques of the present disclosure can be employed regardless of the plan selection criteria.

The exemplary planner 30 establishes a heuristic by which sets or families of plans 54 are considered that share structure, such as by employing an A* target value search using a set of partial plans $p_{I \to S_1}$, $p_{I \to S_2}$, ... $p_{I \to S_n}$ which progress from an initial state I to intermediate states $S_1, S_2, \ldots, S_n$. In this approach, for each step, the planner 30 uses the A* target search to attempt to expand the plan most likely to achieve the production goal in the best (e.g., most informative) way. An ideal plan p in this regard would start with the prefix $p_{I \to S_n}$ which takes the system 20 to a state $S_n$ and continues with the suffix plan $p_{S_n \to G}$ leading from the state $S_n$ to the goal state G. This A* technique chooses the partial plan $p_{I \to S_n}$ to expand using a heuristic function $f(S_n)$ provided by the diagnosis engine 40 which estimates the total path quality as the quality of the plan prefix $P_{I \to S_n}$ (written as $g(S_n)$), plus the predicted quality of the suffix $p_{S_n \to G}$, (written as $h(S_n)$). In the illustrated embodiments, therefore, the planner 30 employs a heuristic function derived by the diagnosis engine 40 based at least partially on the description of the system architecture and dynamics in the plant model 50.

Figure 7:
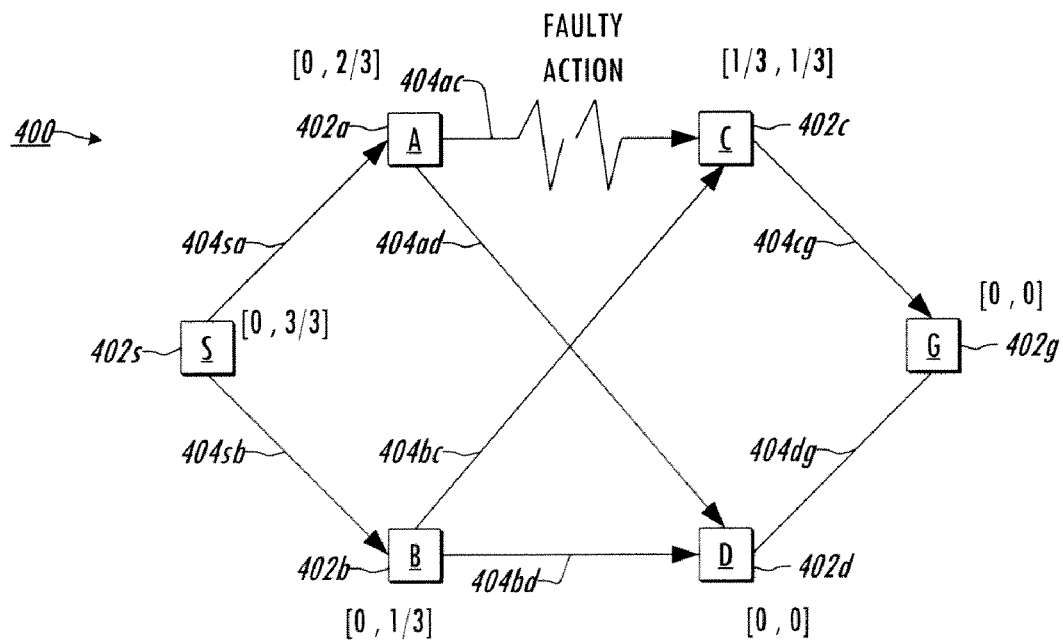
FIG. 7 is a schematic diagram illustrating an exemplary state/action diagram showing possible plans for transitioning the system state from a starting state to a goal state in the production system of FIGS. 1 and 3.

FIG. 7 shows an exemplary state/action diagram 400 depicting possible plans for transitioning the system state from a starting state S to a goal state G in the plant 20. In this example, the system state nodes 402 include the starting state S 402*s*, the goal stage G 402*g*, and four intermediate states 402*a*-402*d* for nodes A-D, respectively. A given plan 54 for this example proceeds by following actions 404 through the diagram 400 to ultimately reach the goal G 402*g*. One possible plan 54 that satisfies such a production goal moves the system through the state sequence [S, A, C, G] through actions 404*sa*, 404*ac*, and 404*cg* as shown in FIG. 7. Assuming for illustrative purposes that this plan 54 results in a failure caused by a faulty action 404*ac* between nodes A and C due to a single persistent fault in one of the system resources 21-24, the diagnosis engine 40 would determine from the plan 54 and the resulting fault observation 56 that all of the actions 404*sa*, 404*ac*, and 404*cg* along the plan path are (without further information) suspected of being faulty. In this example, the planner 30 will construct the plan 54 [S, A, D, G] for execution in the plant 20. The plan 54 may or may not succeed, and in either case something may be learned from a diagnostic perspective. For instance, if the plan [S, A, D, G] fails, the diagnosis engine 40 learns that node $a_{S,A}$ was the failed action (for the assumed single persistent fault scenario), and if the plan 54 is successful, the diagnosis engine 40 can further refine the belief model 42 by eliminating action 404sa as a fault suspect.

The planner 30 can also facilitate the selective avoidance of known faulty resources 21-24 in the plant 20 via the component 32b, as well as generation of plans 54 so as to help determine the source of faults observed during production. For example, the planner 30 operating the above described modular printing system plant 20 of FIG. 2 can be influenced by diagnostic objectives 34b (FIG. 3) to preferentially construct paper paths via appropriate routing of substrates to use different subsets of routing and printing components 24 and 22, where a given sequence of these paths can be used to isolate the cause of an observed fault. Moreover, multiple plant pathways, redundancy of plant resources, and the capability to operate resources at different speeds, directions, voltage levels, temperatures, or other flexibility in setting operational parameters of the plant resources allows the planner 30 to tailor active production plan generation for intelligent diagnostic information gain despite lack of complete sensor coverage in a given plant 20. In this manner, the modularity and flexibility of a given system 20 can be exploited by the pervasive diagnostic features of the control system 2 to facilitate diagnostic objectives 34b while also providing benefits with regard to flexibility in achieving production goals.

In this implementation, the planner 30 may receive a production print job 51 from a job queue (in the producer 10, or a queue in the planner 30), and one or more plans 54 are constructed as described above to implement the job 51. The observations 56 are provided to the diagnosis engine 40 upon execution of the plan(s) 54 to indicate whether the plan 54 succeeded or failed (e.g., bent corners and/or wrinkles detected by the sensors 26 in printed substrates). The diagnosis engine 30 updates the hypothesis probabilities of the belief model 42 based on the executed plan 54 and the observations 56. When a fault occurs, the planner 30 constructs the most informative plan 54 in subsequent scheduling so as to satisfy the diagnostic objectives 34b.

In addition to addressing single persistent faults in the production resources 21-24, the diagnosis engine 40 may also derive fault probabilities for intermittent faults, and multiple fault situations based on the counter values 43 ($m_{11}$, $m_{10}$, $m_{01}$, and $m_{00}$) maintained in the belief model 42. In this regard, isolating intermittent faults can be difficult, particularly if a fault occurs infrequently. For instance, a print engine that prints one blank page out of a 1000 or a computer that spontaneously reboots once per day is unacceptable, but the faulty component can be difficult to identify. Accurate assessment of intermittent failure probabilities is valuable in diagnosing and repairing equipment, and the presently disclosed techniques and systems provide a framework for estimating both persistent and intermittent resource failure probabilities, and for continuously updating the estimates while the plant continues to operate. The exemplary system of FIGS. 1-3 constitutes a continuously running manufacturing line which changes paper from one state (e.g., blank) to another state (marked on, stapled, bound, etc.), in which the limited sensor capabilities (e.g., sensors 26 in FIG. 2) provide a fairly constant stream of observations 56 to the diagnosis engine 40, including indications of substrates that encountered a faulty resource 21-24 in the plant 20. The diagnosis engine 40 employs the estimation component 44 and the counter values 43 to estimate the probabilities of module failures from this data stream in conjunction with the listings of plan states through which the substrates traveled in executing a given plan 54.

The planner 30 in this example constructs a plan for each substrate, where the individual substrate itineraries constitute plans 54, and multiple plans 54 can be concatenated to implement multi-substrate print jobs. The individual plans 54 thus specify the full trajectory each substrate traverses through the plant 20, which can be represented as an ordered list of resources 21-24, including specification of actions and operational states of resources (e.g., whether a transport mechanism is operated in a forward or reverse direction, etc.). The plans 54 in large systems can include a large number of resource modules 21-24, and a given plan may call for a substrate to traverse a given resource more that once. Failure may be detected in two ways. For instance, a substrate may arrive at a resource while it is still handling a previous substrate, which access fault can be detected by module sensors and the module will immediately stop moving the substrates (manifested as a "jam"). Second, the system senses the output of the print engine matrix (e.g., via sensors 26 in FIG. 2) and can thus detect if the substrate has been damaged in any way. Such substrate defects can include a dog ear at one of the corners, scuff marks on the paper caused by rollers (called nips) gripping the paper too tightly, leading edge damage to the substrate (e.g., caused by the substrate encountering a protrusion as it moves through the system 20, and/or the substrate being crumpled or shredded inside the machine 20). In contrast to digital circuit systems (where signal levels map to substrates), therefore, this type of production system has certain characteristics, including inability to mask or cancel errors, no ability for the system to repair a damaged substrate, and the fact that a given substrate may be touched by the same module resource more than once.

A plan 54 or itinerary and its outcome can be represented as the sequence of resource modules touched by the substrate followed by Fail or Success. For example, in the simplified system 530 of FIG. 12, a plan 54 in which a substrate sequentially passes through modules A,B,C,D,E,B,C and moves to the output tray without damage is represented as (A,B,C,D,E,B,C,Success). Using the same convention, a plan 54 in which a substrate passes through modules A and B and then jams in C is represented as (A,B,C,Fail). The present disclosure provides solutions for all combinations of multiple and persistent faults.

FIG. 8 illustrates an exemplary method 700 for estimating failure probabilities for production system resources in accordance with various aspects of the present disclosure production system. Although the method 700 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 700 other methods of the disclosure may be implemented in hardware, software, or combinations thereof, such as in the exemplary control system 2 described above, and may be embodied in the form of computer executable instructions stored in a computer readable medium, such as in a memory operatively associated with the control system 2 in one example.

The method 700 includes maintaining a set of four count values at 702 (e.g., values 43 in the system of FIGS. 1 and 3 above) for each of a plurality of resources in a production system. The count values for each individual resource m include a first count value $m_{11}$ indicating a number of plans where the resource m was used and failed, a second count value $m_{10}$ indicating a number of plans where the resource m was used and succeeded, a third count value $m_{01}$ indicating a number of plans where the resource m was not used and failed, and a fourth count value $m_{00}$ indicating a number of plans where the resource m was not used and succeeded. At 704, an ordered list of resources and a corresponding success/failure status are received, and the sets of counters $m_{11}$, $m_{10}$, $m_{01}$, or $m_{00}$ are updated at 706 according to the list and the status (e.g., based on the executed plant 54 and the resulting plant observations 56). In particular, for each plan 54 executed in the production system 6, a select one of the count values 43 is incremented for each of the resources (used and unused) based on the list of resources used in the plan and the success or failure of the plan. For each resource, a current fault probability value is estimated at 708 for single or multiple, persistent or intermittent faults based on at least one of the corresponding set of count values 43, and the current probability values 43 are stored.

FIG. 9 illustrates a diagram 500 showing the various possibilities, including single persistent fault, single intermittent fault, multiple persistent faults and multiple intermittent faults, and the diagram 510 in FIG. 10 shows the characteristics of the individual counter values 43 for each resource. The probability estimation (at 708 in FIG. 8) in the diagnosis engine 40 applies various assumptions with respect to the reprographic resources in the system of FIG. 2. A first premise is that every faulty module output is observable (catastrophic fault assumption), and another is that any damage to a substrate cannot be rectified by later resources 21-24 of the system 6. In addition, fault probabilities are assumed to be stationary, as opposed to drifting probabilities, and it is assumed that faulty resources produce bad outputs. Furthermore, the substrate is assumed to be incapable of damaging a module resource, and it is further assumed that observations themselves do not affect machine behavior. Moreover, all faults are assumed to be distinguishable (indistinguishable faults may be collapsed). The process 700 in FIG. 8 requires only the sequence of plan-outcome pairs as input information.

Single Persistent Fault

For the case of a single persistent fault, $p_t(M)$ is the probability the module is faulted, and the sequential Bayesian filter is given by the following equation (1):

$$p_t(M|O,U) = \alpha p(O|M,U) p_{t-1}(M), \quad (1)$$

where $\alpha$ is chosen so that the posterior probabilities sum to 1 (presuming we start with the knowledge there is a fault). Defining the usage U to be whether the module was used in the plan that produced the observation, $p(O|M,U)$ is 1 in situations where $m_{00}$ or $m_{11}$ are incremented, and otherwise it is zero. Thus, if a given resource module is not used in a failing plan, it is exonerated as not being the source of the assumed single persistent fault. The resource is also exonerated if it was used in a successful plan, since it is assumed that every fault is observable. Using the updated counter values, therefore, the fault probability estimation (single persistent fault case) at 708 (FIG. 8) involves exonerating the resource by setting the current fault probability to zero if the second or third count values $m_{10}$ or $m_{01}$ are greater than zero. This result is illustrated and posterior probability diagram 520 in FIG. 11. Otherwise, the current fault probability is set to 1/X, where X is the number of resources where both the second and third count values $m_{10}$ and $m_{01}$ are zero.

Figures 11, 12, 13:
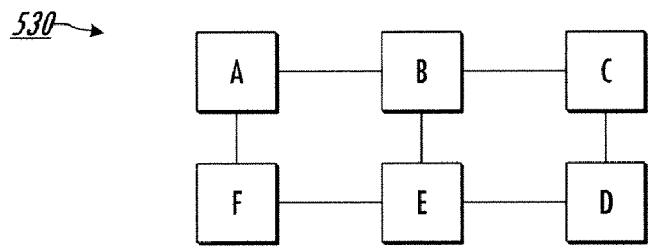
FIG. 11 is a schematic diagram illustrating an exemplary observation function for a single persistent fault in the condition estimation component in FIGS. 1 and 3.
FIG. 12 is a schematic diagram illustrating a simplified production system with six resources A-F and possible interaction paths.
FIG. 13 is a table illustrating an exemplary set of posterior resource fault probability values for the exemplary single persistent fault case in the system of FIG. 12.

To illustrate, FIG. 12 shows an exemplary set of modules A-F and exemplary interaction paths therebetween, which are representative of resource modules in the printing system 20 of FIG. 2 above. In one example, at an initial time t=0, all modules fail with prior probability that is initialized before execution of any plans 54 to $p_0 = 10^{-10}$. An exemplary sequence of three plans 54 are then executed with the corresponding results as follows: (A,B,C,D,E,F,Fail), (A,B,C,Success), (E,F,Success). After the counter values are initialized (first data row for t=0 in the result table 540 of FIG. 13) and the initial (A,B,C,D,E,F,Fail) plan is executed, it is assumed that one of the six resources is faulted at t=1. As shown in the second data row in FIG. 13, each resource at t=1 must be suspected of being faulted with a probability value of ⅙. For the assumed single persistent fault case with the above assumptions, a successful plan exonerates all the resources used in the plan 54. Consequently, subsequent execution of the plan (A,B,C,Success) indicates that modules A, B, and C are all working correctly, with their corresponding $m_{10}$ counter values are non-zero (incremented at t=2) and these are exonerated (probability value zeroed at t=2 in FIG. 13). Thereafter at t=3, execution of the plan (E,F,Success) exonerates modules E and F as their $m_{10}$ counter values are incremented. At this point, the resource D is determined to be faulted with probability 1 as shown in FIG. 13.

Single Intermittent Fault

In the case of a single intermittent fault, the fault probability value estimation at 708 in FIG. 8 includes exonerating the resource (setting the current fault probability to zero) if the third count value $m_{01}$ is greater than zero, and setting the current fault probability according to the equation $\alpha w p_0(M)$, where $\alpha$ is a value selected so that the posterior fault probabilities for all the resources sum to 1, where w is determined according to the following equation:

$$w = \left[\frac{m_{10}}{m_{11}+m_{10}}\right]^{m_{10}} \left[\frac{m_{11}}{m_{11}+m_{10}}\right]^{m_{11}},$$

and where $p_0(M)$ is the prior resource fault probability value. In this single intermittent fault case, the resource fault probability value $p(O|M, U)$ is 0 if the counter value $m_{01}$ is incremented (resource not used, plan fails) and 1 if $m_{11}$ is incremented (resource used in a failed plan).

For the other possibilities ($m_{10}$ or $m_{00}$ incremented), the resource fault probability value $p(O|M, U)$ is estimated using the count values 43. In this regard, the probability that a resource produces an incorrect output if faulted is calculated as $m_{11}/(m_{11}+m_{10})$, where the denominator can never be zero. The previous fault probability estimate for a module m is $p_0(M)$, and given a particular observation O, Bayes rule gives: $p_1(M|O, U) = \alpha p(O|M, U) p_0(M)$, where U represents whether the module was used in the executed plan 54. The observation function $P(O|M, U)$ is estimated from the counts $m_{ij}$. If the observation was a failure and m was used in the plan ($m_{11}$ incremented), then $p(\text{Fail}|M=m, U) = m_{11}/(m_{11}+m_{10})$. If instead the plan succeeded and the resource was used ($m_{10}$ incremented), then $p(\text{Success}|M=m, U) = m_{10}/(m_{11}+m_{10})$. Otherwise (if resource module m was not used), m cannot affect the observation O, and if the result was a success (good), $p(\text{Success}|M=m, U)=1$, or if the result was a fault (bad), then $p(\text{Fail}|M=m, U)=0$, per the single fault assumption. The resulting observation function results are shown in the diagram 550 in FIG. 14.

Iterating Bayes rule leads to $p_t(M|O) = \alpha p(\text{good})^g p(\text{bad})^b p_0(M)$, where there are g observations of m-used good behavior and b observations of m-used bad behavior, which can be formalized in the following equations (2) and (3):

$$p_t(M \mid O, U) = \begin{cases} 0 & \text{if } m_{01} > 0 \\ \alpha w p_0(M) & \text{otherwise,} \end{cases} \quad (2)$$

where $$w = \left[\frac{m_{10}}{m_{11} + m_{10}}\right]^{m_{10}} \left[\frac{m_{11}}{m_{11} + m_{10}}\right]^{m_{11}}. \quad (3)$$

Referring also to the table 560 in FIG. 15 and the system resource modules A-F in FIG. 12, the following illustrates the operation of the estimation component 44 in the single intermittent fault case with the following plans 54 being executed sequentially: (A,B,C,D,E,F,Fail), (A,B,C,Success), (E,F,Success). As shown in FIG. 15 (t=0), the probability values for the resources A-F are initialized to $10^{-1}$ prior to executing the first plan 54. With execution of the first plan and the resulting observation at t=1 (A,B,C,D,E,F,Fail), each $m_{11}$ counter is incremented to 1 since all resources A-F were used and the plan failed (the other counters $m_{10}$, $m_{01}$, and $m_{00}$ are all zero). As a result, the w values for each resource are 1 in equation (3) above. Thereafter the second plan (A,B,C) is executed and the success observation is received at t=2. The counters ($m_{00}$, $m_{01}$, $m_{10}$, $m_{11}$) for resources A-C are all 0, 0, 1, 1 at this point since these were used in the successful plan, whereas and the counters for resources D-F are all 1, 0, 0, and 1. Based on the above equation (3), w=¼ for resources A-C and w=1 for the remaining resources D-F at T=2. Subsequent execution of a successful third plan at t=3 using resources E and F and the observation (E,F,Success) results in the count values for resources A-C all being 1, 0, 1, and 1, the count values for D are 2, 0, 0, 1, and the count values for resources E and F are 1, 0, 1, and 1, yielding the resulting fault probability values in the row t=3 in the table 560 of FIG. 15. In this example, a job/observation (A,B,C,D,E,F,Success) repeats for seven more iterations, with the table 560 showing the resulting resource fault probability values for t=4 and t=10 based on the corresponding selective counter value incrementing and computation per the above equation (3).

Referring also to FIG. 16, another exemplary scenario is described to further illustrate the operation of the diagnosis engine 30 in the case of a single intermittent fault. In this case, it is assumed that the prior probabilities of intermittent failures are initially equal for all the module resources A-F in FIG. 12. Table 570 in FIG. 16 illustrates the resource fault probability values computed using the above described technique at various times t=2001, 4002, 6003, 8004, and 16,008, respectively, for the scenario in which the resource module D is intermittently faulted and damages one out of every 1001 substrates (starting with substrate 1001). In this example, moreover, the printing system repeatedly executes the plans: (A,B,E,F), (C,B,E,D), (A,B,C), and (F,E,D) sequentially. After 2000 plans, the counts for resources A, F, C, and D are $m_{10}$=1000; $m_{11}$=0 and counts for resource modules B and E are $m_{10}$=1500; $m_{11}$=0. If the module resource D damages the substrate during the plan (C,B,E,D), for the single intermittent fault assumption, the resources A and F are exonerated and their posterior fault probability value is set to 0, since the third count value $m_{01}$ for these resources is now non-zero (these were not used in the plan that failed).

At this point (t=2001 in FIG. 16), the w values from equation (3) above for the resources B and E are given by the following equation (4):

$$\left[\frac{1500}{1501}\right]^{1500} \frac{1}{1501} = .000245. \quad (4)$$

The w term is higher for resources C and D as there have been fewer samples of good behavior observed, as in the following equation (5):

$$\left[\frac{1000}{1001}\right]^{1000} \frac{1}{1001} = .000368. \quad (5)$$

After normalizing, the posterior resource fault probability for modules B and E are: 0.2 and the fault probability values for resources C and D are: 0.3, as shown in FIG. 16. Continuing in this example, no plan failures are observed for the next 2000 plan executions, after which the resource D then damages a substrate in plan (D,E,F) at t=4002. By the single fault assumption, the resources B and C are now exonerated and the fault probability values therefore are zero as shown in FIG. 16 (these resources were not used in the plan that failed, and thus their third count values $m_{01}$ are now non-zero). At this point, moreover, the w values from equation (3) above are now given by the following equations (6) and (7) for resource modules D and E, respectively:

$$\left[\frac{2000}{2002}\right]^{2000} \left[\frac{2}{2002}\right]^2 = 1.352 \times 10^{-7}, \quad (6)$$

$$\left[\frac{3000}{3002}\right]^{3000} \left[\frac{2}{3002}\right]^2 = .601 \times 10^{-7}. \quad (7)$$

After normalizing, the corresponding fault probability values for D and E are p(D|O)=0.7, and p(E|O)=0.3, respectively, as shown in table 570 of FIG. 16 for t=4002. After further operation of the system in sequentially executing the plans (A,B,E,F), (C,B,E,D), (A,B,C), and (F,E,D), the resulting posterior probabilities p(M=m|O,U) are shown in FIG. 16 for other exemplary iterations t=6003, 8004, and 16,008, illustrating how the described technique continuously updates and refines the fault probability estimates 45 of the belief model 42, where it is seen that the most likely suspect is resource D in this example. As seen in this illustration, the assumption of single faults allows selective exoneration of modules that are not used in failed plans. All the modules not exonerated will have the same $m_{11}$ count value, moreover, because under the single fault assumption, only modules that been used in every failing run remain suspect. In this example, therefore, $m_{11}$=1 in equations 4 and 5, and after more observations, $m_{11}$=2 in equations 6 and 7.

It is noted that $m_{11}$ and $m_{10}$ appear in the denominators in the above equation (3). One possible approach to avoid a divide-by-zero error in equation (3) is a Laplace adjustment to make all initial counts 1, which is equivalent to assuming a uniform prior fault probability for all the module resources. Another approach is to observe that equation 3 need never be evaluated until an observation is made, and to therefore include the current observation in the count values prior to computing equation (3).

In another aspect of the present disclosure, moreover, involves multiplying each count value $m_{11}$, $m_{10}$, $m_{01}$, and $m_{00}$ by a weighting factor A after estimating a current fault probability value, where the weighting factor is less than 1 (e.g., 0.99999 in one example). This addresses the situation in which a module has operated perfectly for very large count values before faulting. In this case, if no weighting factor is used, it may take a very long time (e.g., many failing samples) before the faulty resource's posterior fault probability value rises sufficiently to be treated as a leading candidate in the failure diagnosis. The preferred approach is to apply a small exponential weighting factor A at every increment such that counts 100,000 in the past will have only half the weight of new samples (e.g., $\lambda$=0.99999).

Multiple Persistent Faults

Figures 17, 18:
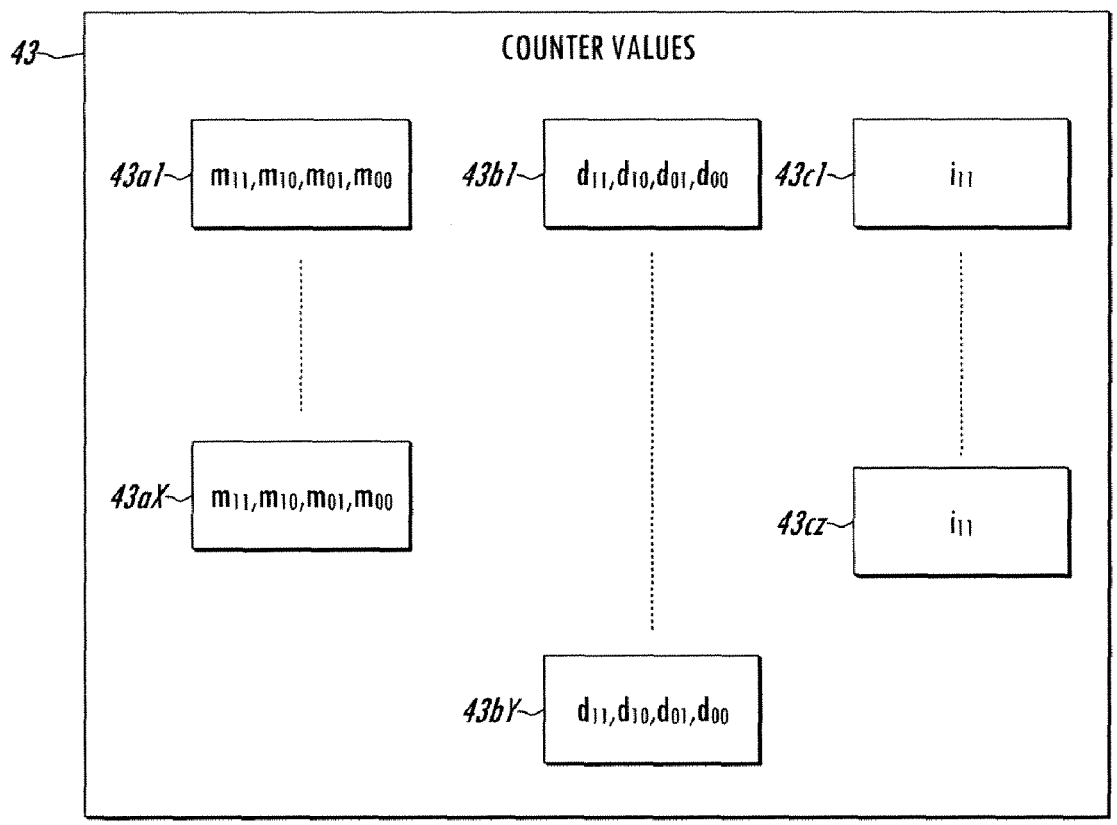
FIG. 17 is a schematic diagram illustrating an exemplary observation function for multiple persistent faults in the condition estimation component in FIGS. 1 and 3.
FIG. 18 is a schematic diagram illustrating an exemplary set of counter values maintained in the diagnosis engine in accordance with the present disclosure.

Referring now to FIGS. 17 and 18, in the case of multiple persistent faults, a diagnosis d is used to assign 'good' or 'faulted' to every member system module resource. In this case, a plurality of unique diagnoses d are evaluated, at least one of which including a single one of the resources m, and at least one of the diagnoses including at least two of the resources m, where each diagnosis has a unique assignment of either good or faulted to each member resource m. For each diagnosis d, the diagnosis engine 40 maintains a set of four diagnosis count values $d_{00}$, $d_{01}$, $d_{10}$, and $d_{11}$. As plans 54 are executed and corresponding observations 56 are obtained from the plant 20, the estimation component 44 selectively exonerates resources of a given diagnosis by setting the current fault probability for that diagnosis to zero if the second or third diagnosis count values $d_{10}$ or $d_{01}$ are greater than zero, and otherwise setting a current diagnosis fault probability to 1/X, where X is the number of diagnoses where both the second and third diagnosis count values $d_{10}$ and $d_{01}$ are zero. Based on this, the estimation component 44 sets the current fault probability for the evaluated resources m according equation (8) below.

The number of possible diagnoses will be exponential as a function of the number of modules. In practice, the diagnosis engine 30 can be configured to only consider a subset of more probable diagnoses. Each tentative diagnosis d has associated counter values: $d_{00}$, $d_{01}$, $d_{10}$, and $d_{11}$. A set of count values is provided, as shown in FIG. 17, with four for each evaluated diagnosis, where the number of counters is an exponential function of the maximum number of module faults to be considered. The diagnosis count values include a first diagnosis count value $d_1$, indicating a number of failed plans where a bad resource of the diagnosis d was used, a second diagnosis count value $d_{10}$ indicating a number of successful plans where a bad resource of the diagnosis d was used, a third diagnosis count value $d_{01}$ indicating a number of failed plans where a good resource of the diagnosis d was not used, and a fourth diagnosis count value $d_{00}$ indicating a number of successful plans where a good resource of the diagnosis d was not used. A set of four counters $m_{00}$, $m_{01}$, $m_{10}$, and $m_{11}$ 43a1-43aX is provided as shown in FIG. 17 for each of the X individual resources m being evaluated in the engine 40 for the single fault cases above, and exemplary diagnostic count values 43b are provided for Y evaluated diagnoses for estimating the multiple fault probability values 45.

The diagnosis count values 43b are incremented as follows for every diagnosis d. The diagnoses in the exemplary case will include a diagnosis for each of the resource modules m being considered, and additional diagnoses for each group of multiple resources to be considered. As with the single fault cases discussed above, not all resources need to be evaluated with respect to fault probabilities, and similarly, not all possible diagnoses (combinations of evaluated resources) need to be considered in the estimation of fault probabilities. In the illustrated implementations for multiple faults, a plurality of unique diagnoses d are established by the engine 40 for evaluation, in which at least one of the diagnoses includes a single one of the resources m, at least one of the diagnoses includes at least two of the resources m, and one diagnosis represents a case of no faults.

In a failed plan involving a bad module of d, the count value $d_{11}$ is incremented, and $d_{10}$ is incremented if a successful plan involved a bad module of d. The probabilities p(good|d) and p(bad|d) can now be computed directly in the same way as the single intermittent fault case. Similar to the single persistent fault case discussed above, in the general case, the fault probability is determined as $p_t(D|O,U)=\alpha p(O|D,U)p_{t-1}(D)$, where $\alpha$ is selected so that the posterior fault probabilities for all the diagnoses sum to 1. In determining the prior probability of a diagnosis $p_0(D)$ the modules are assumed to fail independently as per the following equation (8):

$$p_0(D) = \prod_{g \in good(D)} p_0(g) \prod_{b \in bad(D)} (1 - p_0(b)). \qquad (8)$$

Accordingly, if all the resource modules used in a plan 54 are a subset of the good modules of a diagnosis d, then p(Fail|D=d,U)=0 and p(Success|D=d,U)=1. In every remaining case (i.e., if any of the used modules are bad in d), then p(Success|D=d,U)=0 and p(Fail|D=d,U)=1. For the multiple persistent fault case, the probability estimation at 708 in FIG. 8 above involves exonerating the resources of a diagnosis by setting the current fault probability for that diagnosis to zero if the second or third diagnosis count values $d_{10}$ or $d_{01}$ are greater than zero, and otherwise, setting the diagnosis fault probability to 1/X, where X is the number of diagnoses where both the second and third diagnosis count values $d_{10}$ and $d_{01}$ are zero. FIG. 18 illustrates the observation function in the multiple persistent fault case for an observation o of plan U. The posterior probability that a particular module is faulted is simply the sum of the probabilities of the diagnoses in which it appears:

$$p(m | o_1, \ldots, o_t) = \sum_{d \ s.t. m \in d} p(d | o_1, \ldots, o_t).$$

where m is the resource, $o_1, \ldots o_t$ is a set of observations, and d ranges over the remaining set of suspect candidates S (for which the third count value $d_{01}$ is zero).

Multiple Intermittent Faults

The estimation component 44 is adapted to estimate the failure probabilities using one or more approaches as described hereinafter. The component 44 is further operative to estimate the failure intermittency rate, alone or in combination with the fault probability estimation. A first probability estimation approach employs the counter values 43, and is efficient in terms of both CPU time and memory, whereas the second approach is believed to provide improved accuracy, although more computationally intensive.

The counter technique for the multiple intermittent fault case involves replacement of every occurrence of a single module fault with a candidate diagnosis d, and use of the above described count values 43 for the diagnoses. Application of Bayes rule yields a fault probability: $p_t(D|O,U)=\alpha p(O|D,U)p_{t-1}(D)$ as in the above multiple persistent fault case. Each tentative diagnosis d has associated counter values 43b $d_{00}$, $d_{01}$, $d_{10}$, and $d_{11}$ as shown in FIG. 17 and described above, where the number of counters 43b for full coverage is an exponential function of the maximum number of module faults to be considered. As in the multiple persistent fault case described above, the individual diagnoses d are unique, at least one of which including a single one of the resources m, and at least one of the diagnoses d including two or more of the resources m, with each diagnosis d having a unique assignment of either good or faulted to each member resource m.

In operation, the diagnostic engine increments the diagnosis counters 43b in selective fashion as plans 54 are executed in the plant 20 and the corresponding observations 56 are received for the considered diagnoses d. When the received observation 56 indicates that a plan 54 has failed involving a bad module m of d, the count value $d_{11}$ is incremented, and otherwise $d_{10}$ is incremented. Using the counter values 43, the estimation component 44 computes p(good|d) and p(bad|d) directly in the same way as the single intermittent fault case above. In the system of FIG. 12, for consideration of both single and double faults, for example, there are 22 possible diagnoses, including one for no faults, 6 possible single faults, and 15 double faults. To illustrate, a first executed plan 54 and observation 56 are (A,B,C,D,E,F,Fail). At this point, $d_{11}=1$ for all remaining 21 diagnoses (the 'no faults' diagnosis failed). In this illustrative example, the next executed plan 54 and observation 56 are (A,B,C,Success). The diagnosis engine 40 increments $d_{10}$ for the following 15 diagnoses: A, B, C, AB, AC, AD, AE, AF, BC, BD, BE, BF, CD, CE, and CF. Table 590 in FIG. 19 lists the count values $d_{11}$ and $d_{10}$ after further plan/observations (E,F,Success), (A,B,C,D,E,F,Success) and (A,B,C,D,E,F,Success). Table 600 in FIG. 19 lists the corresponding posterior diagnosis probabilities for the suspect diagnoses, and the estimation component 44 estimates the posterior probability of any particular component resource m according to the above noted formula $$p(m \mid o_1, \ldots, o_t) = \sum_{d \, s.t. m \in d} p(d \mid o_1, \ldots, o_t).$$

where d ranges over the remaining set of suspect candidates S (those for which $d_{01}=0$). If the plan/observation (A,B,C,fail) is followed by (D,E,F,fail), in the single fault case, this would produce an error. As before, consider candidate diagnoses of size 2 or smaller. In the multiple intermittent fault case, however, p=0.11 for all diagnoses. The individual component failure probabilities are all: p=0.33. The probabilities sum to 2 because the system contains 2 faults.

In the second approach for multiple intermittent faults, application of Bayes rule yields: $p_t(D|O,U)=\alpha p(O|D,U)p_{t-1}(D)$. Assuming $p_b(m)$ is given as the probability that a module m produces an incorrect output when faulted, $P_t D|O,U$ is given by:

$$p_t(D \mid O, U) = \begin{cases} 1 - \prod_{m \in bad(D) \cap U} (1 - p_b(m)) & \text{If Fail} \\ \prod_{m \in bad(D) \cap U} (1 - p_b(m)) & \text{If Success} \end{cases}$$

The estimation component 44 determines the posterior probabilities of the diagnoses by repeated application of Bayes rule resulting in:

$$p_t(D \mid O, U) = \begin{cases} \prod_{U \text{ fails}} \left[ 1 - \prod_{m \in bad(D) \cap U} (1 - p_b(m)) \right] \\ \prod_{U \text{ succeeds}} \prod_{m \in bad(D) \cap U} (1 - p_b(m)) \end{cases}$$

The second term (i.e., success) is computed by maintaining the counter (as in the single fault case) $m_{10}$ for each resource as follows:

$$\prod_{U \text{ succeeds}} \prod_{m \in bad(d) \cap U} (1 - p_b(m)) = (1 - p_b(m))^{m_{10}}.$$

To compute the first term, a single counter $I_{11}$ (counters $i_{11}$, 43c in FIG. 17) is associated with each set of modules m utilized in a failing plan i (54), where I is a set of all such sets which have failed at least once. The first term is then computed as:

$$\Pi_{U \text{ fails}} [1 - \Pi_{m \in bad(D) \cap U}(1 - p_b(m))] = \Pi_{i \in I}[1 - \Pi_{m \in bad(D) \cap i}(1 - p_b(m))]^{i_{11}},$$

where the diagnosis engine 40 need not store the module sets of successful plans 54. This second approach to estimating multiple intermittent fault probabilities is believed to provide better accuracy as a tradeoff for increased computational intensity.

Learning Intermittency Rates

As noted above, each resource m of a plant 20 can be good or faulted, and thus none, some, or all of K modules m can conceivably cause a fault and thus adversely affect the produced product(s) 52 of the plant 20 with an unknown probability $q_k$, where $q_k=0$ for a good module and $q_k>0$ for a faulty module m. The estimation component 44 of the diagnosis system 40 in certain embodiments is operative to estimate $\{q_k; k=1, 2 \ldots K\}$ from the observations 56 received from the plant 20. This single quantity $q_k$ combines the probability of outputting a correct value when faulted ($p_b(m)$ above) and the probability of being faulted (p(m) above), and thus represents the probability that module k outputs a faulty value. In the following discussion, given a plan 54 w, the output is 0 (undamaged) with probability:

$$g_w = \prod_{k \in w} (1 - q_k).$$

where g is 'good', and this probability is determined by the plan 54 w. An output in this example is deemed to be good when all modules m involved behave correctly, hence the probability $g_w$ takes the product form. The output is 1 (damaged) with probability determined as follows:

$$b_w = 1 - g_w = 1 - \prod_{k \in w} (1 - q_k).$$

For a sequence of observations 56, the observation likelihood is $P(o_1, o_2, \ldots, o_T) = \Pi_t p(o_t)$. The observations 56 can be grouped based on the associated plan 54, e.g., group $w_1$ where all observations from execution of the plan 54 $w_1$. The observation likelihood is determined as:

$$p(o_1, o_2, \ldots, o_T) = \prod_{w_i} [g_{w_i}^{count\_of\_good} \cdot b_{w_i}^{count\_of\_bad}],$$

or equivalently:

$$\ln p(o_1, o_2, \ldots, o_T) = \sum_{w_i} [c_{g_{w_i}} \ln g_{w_i} + c_{b_{w_i}} \ln(1 - g_{w_i})],$$

Using $cg_{wi}$ and $cb_{wi}$ to denote the counts of good and bad outputs when plan $w_i$ is used, respectively, the estimation component 44 determines the optimal $\{q_k, k=1, 2, \ldots K\}$ that maximizes the above observation likelihood by computing the gradient as follows:

$$\frac{\partial \ln p(o)}{\partial q_k} = \sum_{w_i} \left[ \left( \frac{c_{g_{w_i}}}{g_{w_i}} - \frac{c_{b_{w_i}}}{1 - g_{w_i}} \right) \cdot \frac{\partial g_{w_i}}{\partial q_k} \right]$$

$$= \sum_{w_i} \left[ \left( \frac{c_{g_{w_i}}}{g_{w_i}} - \frac{c_{b_{w_i}}}{1 - g_{w_i}} \right) \cdot (-1) \prod_{j \in w_i, j \neq k} (1 - q_j) \right]$$

Here $cg_{wi}$ and $cb_{wi}$ are determined from the counter values 43 above, and any gradient descent type of determination may be used to search for the optimal value of $q_k$, where the cost surface is a polynomial of $g_{wi}$, and $g_{wi}$ is a polynomial of $q_k$'s.

As a simpler approximation for any given plan 54 w, the estimation component 44 can compute a corresponding empirical success rate as:

$$\hat{g}_w = \frac{c_{g_w}}{c_{g_w} + c_{b_w}}.$$

When the total count $cg_w + cb_w$ are large enough, the empirical success rate will converge to the true value $g_w$. Furthermore, we can consider $\hat{g}_w$ as an average over a set of $N_w$ independent and identically distributed variables, i.e., $$\hat{g}w = \frac{\sum_t \bar{x}_t}{N_w},,$$

where $x_t$ is a binary random variable taking value 1 with probability $g_w$ and 0 with probability $1-g_w$. From the Law of Large Numbers, the average converges to a Gaussian distribution as $N_w$ increases, and the Gaussian distribution has a mean and a variance as follows:

$$\mu = \frac{1}{N_w} \sum_t E(x_t) = g_w$$

$$\sigma^2 = \frac{1}{N_w^2} \sum_t \text{var}(x_t) = \frac{g_w(1 - g_w)}{N_w}$$

As a least-squares formulation, the good probability of any plan 54 $w$ is what is empirically observed, and $\Pi_{k \in w}(1-q_k)$ is the expected observation. The estimation of $q_k$'s can be formulated in the estimation component 44 as a least-squares fit to determine $\{\hat{g}_w\}$ to minimize the following total discrepancy:

$$\varepsilon = \sum_{distinct_w} \left\| \prod_{k \in w} (1 - q_k) - \hat{g}_w \right\|^2,$$

with:

$$\frac{\partial \varepsilon}{\partial q_k} = -\sum_{distinct_w} \left[ 2\left( \prod_{k \in w} (1 - q_k) - \hat{g}_w \right) \prod_{j \in w, j \neq k} (1 - q_j) \right],$$

The estimation component 44 may further implement a weighted least-squares formulation that treats all plans 54 the same way, although the plans 54 do not get the same count of trials. For example, a plan 54 that is executed 100 times gives more dependable success rate than another plan 54 which is only executed a few times. However, the least-squares formulation neglects the variable degree of confidence, and a weighted least-squares formulation can be implemented in the estimation component 44 to focus more on the plans 54 with a large number of trials (executions). The cost to minimize is:

$$\varepsilon = \sum_{distinct_w} N_w \left\| \prod_{k \in w} (1 - q_k) - \hat{g}_w \right\|^2.$$

where $N_w$ is the total number of trials that plan w is executed, i.e., $N_w = cg_w + cb_w$. In this case, the gradient is:

$$\frac{\partial \varepsilon}{\partial q_k} = -\sum_{distinct_w} \left[ 2N_w \left( \prod_{k \in w} (1 - q_k) - \hat{g}_w \right) \prod_{j \in w, j \neq k} (1 - q_j) \right].$$

The estimation component 44 in other embodiments implements a coordinate descent algorithm to determine an optimal $\{\hat{g}_w\}$. Fixing all-but-one q-values, and vary only one $q_k$, an optimal $q_k$ value can be obtained via closed form by setting $$\frac{\partial \hat{\varepsilon}}{\partial q_k}$$

to 0, to yield:

$$\sum_{distinct_w} \left[ N_w \left( \prod_{k \in w} (1 - q_k) - \hat{g}_w \right) \prod_{j \in w, j \neq k} (1 - q_j) \right] = 0.$$

For $\alpha_{k,w} = \Pi_{j \in w, j \neq k}(1 - q_j)$, the above equation is re-written as:

$$\sum_{distinct_w} [N_w(\alpha_{k,w}(1 - q_k) - \hat{g}_w) \cdot \alpha_{k,w}] = 0,$$

and thus:

$$(1-q_k) = \frac{\sum_w N_w \hat{g}_w \alpha_{k,w}}{\sum_w N_w \alpha_{k,w}^2}.$$

Because $\hat{g}_w$ is approximately Gaussian with mean $v=g_w$ and variance $$\sigma^2 = \frac{g_w(1-g_w)}{N_w},$$

the following can be evaluated:

$$\ln p(\hat{g}_w) = \frac{\|\hat{g}_w - \mu\|^2}{2\sigma^2} = \frac{N_w \|\hat{g}_w - g_w\|^2}{2g_w(1-g_w)}.$$

Compared to the cost function in the weighted least-squares formulation above, the linear term $N_w$ is similar to the quadratic discrepancy term, and the denominator is missing. This assumes $g_w(1-g_w)$ is more or less the same for all w, which provides a simpler implementation.

Figures 21, 22:
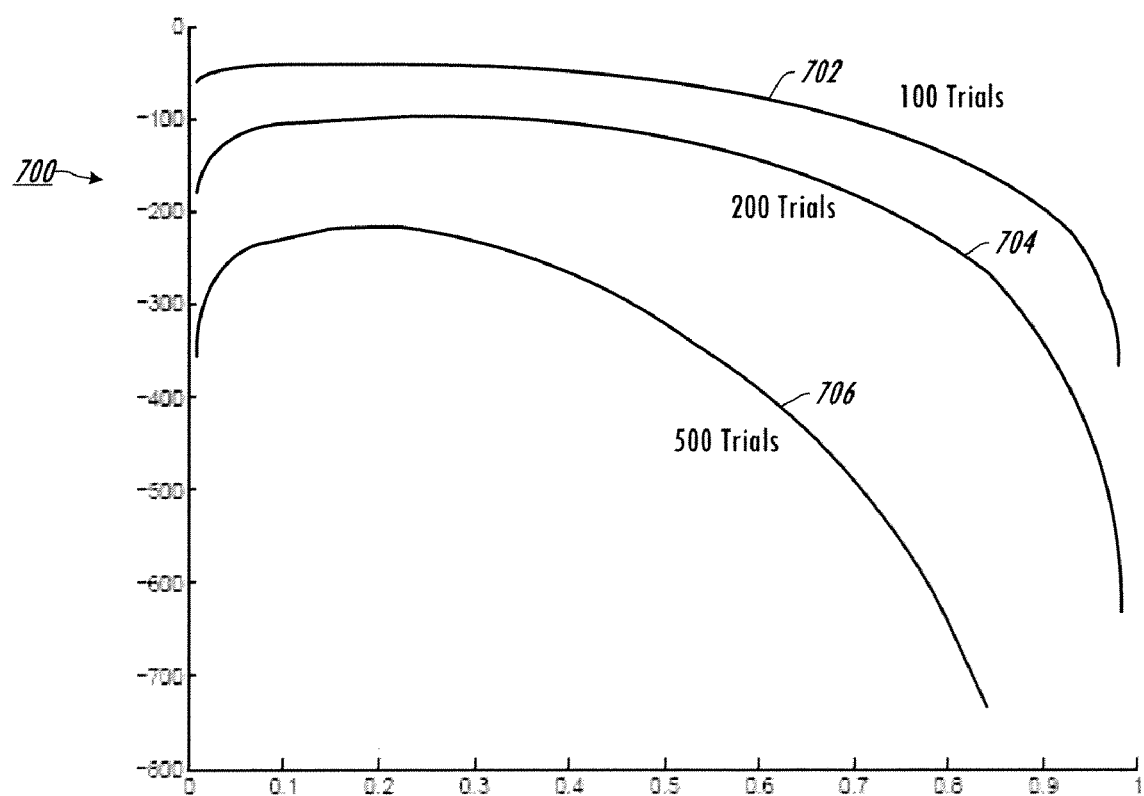
FIG. 21 is a schematic diagram illustrating an exemplary observation function for multiple intermittent faults in the condition estimation component in FIGS. 1 and 3.
FIG. 22 is a graph showing estimation of intermittency rates as a function of the number of trials.

The estimation component 44 is operative to determine intermittency parameters of module failure, denoted for simplicity as q, for multiple intermittent faults as in the single-fault case. In one embodiment, q is a single scalar (assuming that all the modules have the same intermittency parameter) or alternatively can be computed as a vector (allowing the modules to have different intermittency). The component 44 operates to estimate the value of q so as to best match the observations 56 (O), where q is treated as a deterministic unknown parameter, and the estimation is formulated as a maximum-likelihood estimation problem:

$$\hat{q}_{ML} = \underset{q}{\arg\max}\, p_q(O).$$

where O is the observation history, i.e, the plans 54 and their corresponding observations 56. The term $p_q(O)$ is evaluated as:

$$p_q(O) = \sum_D p_q(O\mid D)p(D)$$

where p(D) is the prior probability, initially all equal for all hypotheses. The observation likelihood $p_q(O|D)$ is the p(O|D, U) above; the plan 54 U is known, and this U is removed to simplify the notation. Thus, given any intermittency parameter q, the estimation component 44 evaluates the observation likelihood $p_q(O)$ by the above formulation, and obtains an optimal estimate by search over the space for maximal $p_q(O)$. In one illustrative example, assuming all faulty modules have the same intermittency parameter, given any plan 54, the probability of observing a success or a failure is:

$$p_q(O\mid D, U) = \begin{cases} 1-(1-q)^{m(D,U)} & \text{if Fail} \\ (1-q)^{m(D,U)} & \text{if Success} \end{cases}$$

where the exponent $$m(D, U) \triangleq |\text{bad}(D) \cap U|$$

denoted the number of bad modules m in the hypothesis D(diagnosis) involved in the plan 54 U. For any given D and U, n(D; U) is evaluated, by which $p_q(O)$ can be expressed as a polynomial function of q. The estimation component 44 then searches for an optimal $q \in [0,1]$. Results were simulated for an exemplary simple system having five modules, two of which having faults with an intermittency rate of 0.2, as shown in the graph 700 of FIG. 22. The curves 702, 704, and 706 show the computed observation likelihood $p_q(O)$ as a function of q with the maximum likelihood estimate marked with a circle for intermittency estimation based on 100, 200, and 500 trials, respectively. The graph 700 illustrates that with more trials, the estimated q is closer to the underlying true value. For example, with 500 trials, $\hat{q}_{ML}=0.19$ (actual value is 0.2).

The resources of a given plant 20 may be capable of operating at different performance levels, and in different modes, whereby the above described failure probability estimation techniques can be extended to differentiate between faulty actions/capabilities/modes (hereinafter capabilities) and functioning capabilities within a given module resource. It is possible to design machine configurations where a failure in the output capability of one module cannot be distinguished from a failure in the input capability of the connected module, and this can be accommodated by collapsing indistinguishable faults.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method for estimating failure probabilities for resources in a production system, the method comprising:

using at least one processor, maintaining a set of four count values for each of a plurality of resources in a production system, the four count values for each individual resource m including:

a first count value $m_{11}$ indicating a number of plans where the resource m was used and failed, a second count value $m_{10}$ indicating a number of plans where the resource m was used and succeeded, a third count value $m_{01}$ indicating a number of plans where the resource m was not used and failed, and a fourth count value $m_{00}$ indicating a number of plans where the resource m was not used and succeeded;

using the at least one processor, for each plan executed in the production system, incrementing a select one of the count values for each of the resources based on a list of resources used in the plan and the success or failure of the plan;

using the at least one processor, for each resource, estimating a current fault probability value for single or multiple, persistent or intermittent faults based on at least one of the corresponding set of count values; and using the at least one processor, storing the current fault probability values for the resources.

2. The method of claim 1, wherein for each resource, estimating the current fault probability value for a single persistent fault includes:

using the at least one processor, exonerating the resource by setting the current fault probability to zero if the second or third count values $m_{10}$ or $m_{01}$ are greater than zero; and otherwise, using the at least one processor, setting the current fault probability to 1/X, where X is the number of resources where both the second and third count values $m_{10}$ and $m_{01}$ are zero.

3. The method of claim 1, wherein for each resource, estimating the current fault probability value for a single intermittent fault includes:

using the at least one processor, exonerating the resource by setting the current fault probability to zero if the third count value $m_{01}$ is greater than zero; and otherwise, using the at least one processor, setting the current fault probability according to the equation $\alpha w p_0(M)$;

where $\alpha$ is a value selected so that posterior fault probabilities for all the resources sum to 1;

where w is determined according to the following equation:

$$w = \left[\frac{m_{10}}{m_{11}+m_{10}}\right]^{m_{10}} \left[\frac{m_{11}}{m_{11}+m_{10}}\right]^{m_{11}};$$

and where $p_0(M)$ is a previous fault probability value.

4. The method of claim 1, for multiple persistent faults, further comprising:

using the at least one processor, establishing a plurality of unique diagnoses d to be evaluated, at least one of the diagnoses including a single one of the resources m, and at least one of the diagnoses including at least two of the resources m, each diagnosis having a unique assignment of either good or faulted to each member resource;

using the at least one processor, maintaining a set of four diagnosis count values for each diagnosis, the four diagnosis count values for each individual diagnosis including:

a first diagnosis count value $d_{11}$ indicating a number of failed plans where a bad resource of the diagnosis d was used, a second diagnosis count value $d_{10}$ indicating a number of successful plans where a bad resource of the diagnosis d was used, a third diagnosis count value $d_{01}$ indicating a number of failed plans where a good resource of the diagnosis d was not used, and a fourth diagnosis count value $d_{00}$ indicating a number of successful plans where a good resource of the diagnosis d was not used;

using the at least one processor, exonerating the resources of a diagnosis by setting the current fault probability for that diagnosis to zero if the second or third diagnosis count values $d_{10}$ or $d_{01}$ are greater than zero;

otherwise, using the at least one processor, setting a current diagnosis fault probability to 1/X, where X is the number of diagnoses where both the second and third diagnosis count values $d_{10}$ and $d_{01}$ are zero; and using the at least one processor, setting the current fault probability for evaluated resources according to the following equation:

$$p(m \mid o_1, \ldots, o_t) = \sum_{d \text{ s.t. } m \in d} p(d \mid o_1, \ldots, o_t).,$$

where m is the resource, $o_1, \ldots o_t$ is a set of observations and d ranges over the remaining set of suspect candidates S for which the third count value $d_{01}$ is zero.

5. The method of claim 1, wherein for each resource, estimating the current fault probability value for multiple intermittent faults includes:

using the at least one processor, establishing a plurality of unique diagnoses d to be evaluated, at least one of the diagnoses including a single one of the resources m, and at least one of the diagnoses including at least two of the resources m, each diagnosis having a unique assignment of either good or faulted to each member resource;

using the at least one processor, maintaining a set of four diagnosis count values for each diagnosis, the four diagnosis count values for each individual diagnosis including:

a first diagnosis count value $d_{11}$ indicating a number of failed plans where a bad resource of the diagnosis d was used, a second diagnosis count value $d_{10}$ indicating a number of successful plans where a bad resource of the diagnosis d was used, a third diagnosis count value $d_{01}$ indicating a number of failed plans where a good resource of the diagnosis d was not used, and a fourth diagnosis count value $d_{00}$ indicating a number of successful plans where a good resource of the diagnosis d was not used;

using the at least one processor, maintaining a list S of remaining suspect candidate diagnoses for which the third diagnosis count value $d_{01}$ is zero; and using the at least one processor, setting a posterior fault probability for evaluated resources according to the following equation:

$$p(m \mid o_1, \ldots, o_t) = \sum_{d \text{ s.t. } m \in d} p(d \mid o_1, \ldots, o_t).$$

where m is the resource, $o_1, \ldots o_t$ is a set of observations, and d ranges over the remaining set of suspect candidates S for which the third count value $d_{01}$ is zero.

6. The method of claim 1, wherein for each resource, estimating the current fault probability value for multiple intermittent faults includes:
   using the at least one processor, maintaining a counter value $i_{11}$ associated with each set of modules m utilized in a failing plan i;
   using the at least one processor, computing a failure term for evaluated resources using the counter value $i_{11}$ according to the following equation:

$$\Pi_{U \text{ fails}}[1-\Pi_{m \in bad(D) \cap U}(1-p_b(m))]=\Pi_{i \in I}[1-\Pi_{m \in bad(D) \cap i}(1-p_b(m))]^{i_{11}},$$

where I is a set of all such sets which have failed at least once, where m is the resource, and where $p_b(m)$ is the probability that a resource m produces an incorrect output when faulted;
   using the at least one processor, computing a success term for the evaluated resources using the counter $m_{10}$ for each resource according to the following equation:

$$\prod_{U \text{ succeeds}} \prod_{m \in bad(d) \cap U} (1 - p_b(m)) = (1 - p_b(m))^{m_{10}};$$

and
   using the at least one processor, setting a posterior fault probability for the evaluated resources according to the following equation:

$$p_t(D \mid O, U) = \begin{cases} \prod_{U \text{ fails}} \left[1 - \prod_{m \in bad(D) \cap U}(1 - p_b(m))\right] \\ \prod_{U \text{ succeeds}} \prod_{m \in bad(D) \cap U}(1 - p_b(m)), \end{cases}$$

where $O=\{o_1, \ldots o_t\}$ is a set of observations and U is an indication of whether the module was used in the plan associated with the observation O.

7. The method of claim 1, further comprising using the at least one processor, initializing the current fault probability values for each of the resources to a predetermined value before execution of any plans in the production system.

8. The method of claim 1, further comprising using the at least one processor, multiplying each count value by a weighting factor after estimating a current fault probability value, the weighting factor being less than 1.

9. A self-diagnosing production control system for controlling operation of a production system to achieve one or more production goals and to diagnose failure status of production resources, the control system comprising:
   at least one processor;
   a planner implemented using the at least one processor and operatively coupled with the production system to provide plans for execution in the production system;
   a plant model implemented using the at least one processor and operatively coupled with the planner and including a model of a plant of the production system; and
   a diagnosis engine implemented using the at least one processor and operatively coupled with the planner, the production system, and the model, the diagnosis engine comprising:
   a belief model including a current fault probability value for single or multiple, persistent or intermittent faults for each of a plurality of resources in the production system, and
   a plant condition estimation component comprising a set of four count values for each of a plurality of resources in the production system, the four count values for each individual resource m including a first count value $m_{11}$ indicating a number of plans where the resource m was used and failed, a second count value $m_{10}$ indicating a number of plans where the resource m was used and succeeded, a third count value $m_{01}$ indicating a number of plans where the resource on was not used and failed, and a fourth count value $m_{00}$ indicating a number of plans where the resource m was not used and succeeded;
   the plant condition estimation component being operative to receive a list of resources used in a plan executed in the plant and the success or failure of the plan, and for each plan executed in the production system, to increment a select one of the count values for each of the resources based on a list of resources used in the plan and the success or failure of the plan, and to estimate a current fault probability value for single or multiple, persistent or intermittent faults based on at least one of the corresponding set of count values, and to store the current fault probability values for the resources.

10. The production control system of claim 9, wherein for each resource, the plant condition estimation component estimates the current fault probability value for a single persistent fault by exonerating the resource by setting the current fault probability to zero if the second or third count values $m_{10}$ or $m_{01}$ are greater than zero, and otherwise, setting the current fault probability to 1/X, where X is the number of resources where both the second and third count values $m_{10}$ and $m_{01}$ are zero.

11. The production control system of claim 9, wherein for each resource, the plant condition estimation component estimates the current fault probability value for a single intermittent fault by exonerating the resource by setting the current fault probability to zero if the third count value $m_{01}$ is greater than zero, and otherwise, setting the current fault probability according to the equation $\alpha w p_0(M)$, where $\alpha$ is $\alpha$ value selected so that posterior fault probabilities for all the resources sum to 1; where w is determined according to the following equation:

$$w = \left[\frac{m_{10}}{m_{11} + m_{10}}\right]^{m_{10}} \left[\frac{m_{11}}{m_{11} + m_{10}}\right]^{m_{11}},$$

and where $p_0(M)$ is a previous fault probability value.

12. The production control system of claim 9, wherein for each resource, the plant condition estimation component estimates the current fault probability value for multiple persistent faults by:
   establishing a plurality of unique diagnoses d to be evaluated, at least one of the diagnoses including a single one of the resources m, and at least one of the diagnoses including at least two of the resources m, each diagnosis having a unique assignment of either good or faulted to each member resource;

maintaining a set of four diagnosis count values for each diagnosis, the four diagnosis count values for each individual diagnosis including:
- a first diagnosis count value $d_{11}$ indicating a number of failed plans where a bad resource of the diagnosis d was used,
- a second diagnosis count value $d_{10}$ indicating a number of successful plans where a bad resource of the diagnosis d was used,
- a third diagnosis count value $d_{01}$ indicating a number of failed plans where a good resource of the diagnosis d was not used, and
- a fourth diagnosis count value $d_{00}$ indicating a number of successful plans where a good resource of the diagnosis d was not used;

exonerating the resources of a diagnosis by setting the current fault probability for that diagnosis to zero if the second or third diagnosis count values $d_{10}$ or $d_{01}$ are greater than zero;

otherwise, setting a current diagnosis fault probability to 1/X, where X is the number of diagnoses where both the second and third diagnosis count values $d_{10}$ and $d_{01}$ are zero; and setting the current fault probability for evaluated resources according to the following equation:

$$p(m \mid o_1, \ldots, o_t) = \sum_{d\ s.t.\ m \in d} p(d \mid o_1, \ldots, o_t).$$

where m is the resource, $o_1, \ldots o_t$ is a set of observations and d ranges over the remaining set of suspect candidates S for which the third count value $d_{01}$ is zero.

13. The production control system of claim 9, wherein for each resource, the plant condition estimation component estimates the current fault probability value for multiple persistent faults by:
establishing a plurality of unique diagnoses d to be evaluated, at least one of the diagnoses including a single one of the resources m, and at least one of the diagnoses including at least two of the resources m, each diagnosis having a unique assignment of either good or faulted to each member resource;
maintaining a set of four diagnosis count values for each diagnosis, the four diagnosis count values for each individual diagnosis including:
- a first diagnosis count value $d_{11}$ indicating a number of failed plans where a bad resource of the diagnosis d was used,
- a second diagnosis count value $d_{10}$ indicating a number of successful plans where a bad resource of the diagnosis d was used,
- a third diagnosis count value $d_{01}$ indicating a number of failed plans where a good resource of the diagnosis d was not used, and
- a fourth diagnosis count value $d_{00}$ indicating a number of successful plans where a good resource of the diagnosis d was not used;

maintaining a list S of remaining suspect candidate diagnoses for which the third diagnosis count value $d_{01}$ is zero; and setting a posterior fault probability for evaluated resources according to the following equation:

$$p(m \mid o_1, \ldots, o_t) = \sum_{d\ s.t.\ m \in d} p(d \mid o_1, \ldots, o_t).$$

where m is the resource, $o_1, \ldots o_t$ is a set of observations and d ranges over, the remaining set of suspect candidates S for which the third count value $d_{01}$ is zero.

14. The production control system of claim 9, wherein for each resource, the plant condition estimation component estimates the current fault probability value for multiple persistent faults by:
maintaining a counter value $i_{11}$ associated with each set of modules m utilized in a failing plan i;
computing a failure term for evaluated resources using the counter value $i_{11}$ according to the following equation:

$$\Pi_{U fails}[1 - \Pi_{m \in bad(D) \cap U}(1 - p_b(m))] = \Pi_{i \in I}[1 - \Pi_{m \in bad(D) \cap i}(1 - p_b(m))]^{i_{11}},$$

where I is a set of all such sets which have failed at least once, where m is the resource, and where $p_b(m)$ is the probability that a resource on produces an incorrect output when faulted;

computing a success term for the evaluated resources using the counter $m_{10}$ for each resource according to the following equation:

$$\prod_{U\ succeeds} \prod_{m \in bad(d) \cap U} (1 - p_b(m)) = (1 - p_b(m))^{m_{10}};$$

and setting a posterior fault probability for the evaluated resources according to the following equation:

$$p_t(D \mid O, U) = \begin{cases} \prod_{U\ fails}\left[1 - \prod_{m \in bad(D) \cap U}(1 - p_b(m))\right] \\ \prod_{U\ succeeds} \prod_{m \in bad(D) \cap U}(1 - p_b(m)), \end{cases}$$

where $O = \{o_1, \ldots o_t\}$ is a set of observations and U is an indication of whether the module was used in the plan associated with the observation O.

15. The production control system of claim 9, wherein the plant condition estimation component initializes the current fault probability values for each of the resources to a predetermined value before execution of any plans in the production system.

16. The production control system of claim 9, wherein the plant condition estimation component multiplies each count value by a weighting factor after estimating the current fault probability value, the weighting factor being less than 1.

17. A non-transitory computer readable medium having computer executable instructions for performing the steps of:
maintaining a set of four count values for each of a plurality of resources in a production system, the four count values for each individual resource m including:
- a first count value $m_{11}$ indicating a number of plans where the resource m was used and failed,
- a second count value $m_{10}$ indicating a number of plans where the resource m was used and succeeded,
- a third count value $m_{01}$ indicating a number of plans where the resource m was not used and failed, and a fourth count value $m_{00}$ indicating a number of plans where the resource m was not used and succeeded;

for each plan executed in the production system, incrementing a select one of the count values for each of the resources based on a list of resources used in the plan and the success or failure of the plan;

for each resource, estimating a current fault probability value for single or multiple, persistent or intermittent faults based on at least one of the corresponding set of count values; and storing the current fault probability values for the resources.

18. The non-transitory computer readable medium of claim 17, comprising further computer executable instructions for estimating the current fault probability value for a single persistent fault by exonerating the resource by setting the current fault probability to zero if the second or third count values $m_{10}$ or $m_{01}$ are greater than zero, and otherwise, setting the current fault probability to 1/X, where X is the number of resources where both the second and third count values $m_{10}$ and $m_{01}$ are zero.

19. The non-transitory computer readable medium of claim 17, comprising further computer executable instructions for estimating the current fault probability value for a single intermittent fault by exonerating the resource by setting the current fault probability to zero if the third count value $m_{01}$ is greater than zero, and otherwise, setting the current fault probability according to the equation $\alpha w p_0(M)$, where $\alpha$ is a value selected so that posterior fault probabilities for all the resources sum to 1, where w is determined according to the following equation:

$$w = \left[\frac{m_{10}}{m_{11}+m_{10}}\right]^{m_{10}} \left[\frac{m_{11}}{m_{11}+m_{10}}\right]^{m_{11}},$$

and where $p_0(M)$ is a previous fault probability value.

20. The non-transitory computer readable medium of claim 17, comprising further computer executable instructions for estimating the current fault probability value for multiple persistent faults by:

establishing a plurality of unique diagnoses d to be evaluated, at least one of the diagnoses including a single one of the resources m, and at least one of the diagnoses including at least two of the resources m, each diagnosis having a unique assignment of either good or faulted to each member resource;

maintaining a set of four diagnosis count values for each diagnosis, the four diagnosis count values for each individual diagnosis including:
 a first diagnosis count value $d_{11}$ indicating a number of failed plans where a bad resource of the diagnosis d was used,
 a second diagnosis count value $d_{10}$ indicating a number of successful plans where a bad resource of the diagnosis d was used,
 a third diagnosis count value $d_{01}$ indicating a number of failed plans where a good resource of the diagnosis d was not used, and
 a fourth diagnosis count value $d_{00}$ indicating a number of successful plans where a good resource of the diagnosis d was not used;

exonerating the resources of a diagnosis by setting the current fault probability for that diagnosis to zero if the second or third diagnosis count values $d_{10}$ or $d_{01}$ are greater than zero;

otherwise, setting a current diagnosis fault probability to 1/X, where X is the number of diagnoses where both the second and third diagnosis count values $d_{10}$ and $d_{01}$ are zero; and setting the current fault probability for evaluated resources according to the following equation:

$$p(m \mid o_1, \ldots, o_t) = \sum_{d \text{ s.t. } m \in d} p(d \mid o_1, \ldots, o_t).,$$

where m is the resource, $o_1, \ldots o_t$ is a set of observations, and d ranges over the remaining set of suspect candidates S for which the third count value $d_{01}$ is zero.

21. The non-transitory computer readable medium of claim 17, comprising further computer executable instructions for estimating the current fault probability value for multiple intermittent faults by:

establishing a plurality of unique diagnoses d to be evaluated, at least one of the diagnoses including a single one of the resources m, and at least one of the diagnoses including at least two of the resources m, each diagnosis having a unique assignment of either good or faulted to each member resource;

maintaining a set of four diagnosis count values for each diagnosis, the four diagnosis count values for each individual diagnosis including:
 a first diagnosis count value $d_{11}$ indicating a number of failed plans where a bad resource of the diagnosis d was used,
 a second diagnosis count value $d_{10}$ indicating a number of successful plans where a bad resource of the diagnosis d was used,
 a third diagnosis count value $d_{01}$ indicating a number of failed plans where a good resource of the diagnosis d was not used, and
 a fourth diagnosis count value $d_{00}$ indicating a number of successful plans where a good resource of the diagnosis d was not used;

maintaining a list S of remaining suspect candidate diagnoses for which the third diagnosis count value $d_{01}$ is zero; and setting a posterior fault probability for evaluated resources according to the following equation:

$$p(m \mid o_1, \ldots, o_t) = \sum_{d \text{ s.t. } m \in d} p(d \mid o_1, \ldots, o_t).$$

where m is the resource, $o_1, \ldots o_t$ is a set of observations and d ranges over the set of suspect candidates S for which the third count value $d_{01}$ is zero.

22. The non-transitory computer readable medium of claim 17, comprising further computer executable instructions for estimating the current fault probability value for multiple persistent faults by:

maintaining a counter value $i_{11}$ associated with each set of modules m utilized in a failing plan i;

computing a failure term for evaluated resources using the counter value $i_{11}$ according to the following equation:

$$\Pi_{U \text{ fails}}[1-\Pi_{m \in bad(D) \cap U}(1-p_b(m))] = \Pi_{i \in I}[1-\Pi_{m \in bad(D) \cap i}(1-p_b(m))]^{i_{11}},$$

where I is a set of all such sets which have failed at least once, where m is the resource, and where $p_b(m)$ is the probability that a resource m produces an incorrect output when faulted;

computing a success term for the evaluated resources using the counter $m_{10}$ for each resource according to the following equation:

$$\prod_{U \text{ succeeds}} \prod_{m \in bad(d) \cap U} (1 - p_b(m)) = (1 - p_b(m))^{m_{19}};$$

and setting a posterior fault probability for the evaluated sources according to the following equation:

$$p_t(D \mid O, U) = \begin{cases} \prod_{U \text{ fails}} \left[1 - \prod_{m \in bad(D) \cap U} (1 - p_b(m))\right] \\ \prod_{U \text{ succeeds}} \prod_{m \in bad(D) \cap U} (1 - p_b(m)), \end{cases}$$

where $O = \{o_1, \ldots o_t\}$ is a set of observations and U is an indication of whether the module was used in the plan associated with the observation O.

* * * * *